United States Patent
Kaplan et al.

(10) Patent No.: US 10,585,805 B2
(45) Date of Patent: Mar. 10, 2020

(54) CONTROLLING ACCESS TO PAGES IN A MEMORY IN A COMPUTING DEVICE

(71) Applicant: Advanced Micro Devices, Inc., Santa Clara, CA (US)

(72) Inventors: David A. Kaplan, Austin, TX (US); Jeremy W. Powell, Austin, TX (US); Thomas R. Woller, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 15/907,593

(22) Filed: Feb. 28, 2018

(65) Prior Publication Data

US 2018/0189190 A1    Jul. 5, 2018

Related U.S. Application Data

(63) Continuation-in-part of application No. 15/417,632, filed on Jan. 27, 2017, and a continuation-in-part of application No. 15/224,302, filed on Jul. 29, 2016, now Pat. No. 10,169,244.

(60) Provisional application No. 62/519,101, filed on Jun. 13, 2017.

(51) Int. Cl.
*G06F 12/10*      (2016.01)
*G06F 12/1009*    (2016.01)
*G06F 9/455*      (2018.01)

(52) U.S. Cl.
CPC ...... *G06F 12/1009* (2013.01); *G06F 9/45545* (2013.01); *G06F 9/45558* (2013.01); *G06F 2009/45583* (2013.01); *G06F 2212/1044* (2013.01); *G06F 2212/152* (2013.01); *G06F 2212/657* (2013.01)

(58) Field of Classification Search
CPC ............ G06F 9/45558; G06F 12/1009; G06F 9/45545; G06F 12/1018
USPC .......................................................... 711/6
See application file for complete search history.

(56) References Cited

U.S. PATENT DOCUMENTS

| | | | | |
|---|---|---|---|---|
| 6,112,286 A | * | 8/2000 | Schimmel | G06F 12/1018 711/203 |
| 2016/0378678 A1 | * | 12/2016 | Lemay | G06F 12/1009 711/163 |

* cited by examiner

*Primary Examiner* — Hua J Song
(74) *Attorney, Agent, or Firm* — Park, Vaughan, Fleming & Dowler LLP

(57) ABSTRACT

A computing device that handles address translations is described. The computing device includes a hardware table walker and a memory that stores a reverse map table and a plurality of pages of memory. The table walker is configured to use validated indicators in entries in the reverse map table to determine if page accesses are made to pages for which entries are validated. The table walker is further configured to use virtual machine permissions levels information in entries in the reverse map table determine if page accesses for specified operation types are permitted.

19 Claims, 11 Drawing Sheets

CONTROLLING ACCESS TO PAGES IN A MEMORY IN A COMPUTING DEVICE

RELATED APPLICATIONS

The instant application is a continuation in part of, and hereby claims priority to, U.S. patent application Ser. No. 15/224,302, which was filed on 29 Jul. 2016, and U.S. patent application Ser. No. 15/417,632, which was filed on 27 Jan. 2017. The instant application also claims priority to U.S. provisional application No. 62/519,101, which was filed on 13 Jun. 2017. Each of these applications are incorporated by reference in their entireties herein.

BACKGROUND

Related Art

Some computing devices execute virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called guest operating systems. The guest operating systems in turn provide support for executing other software programs such as applications, databases, etc.

Some of the computing devices execute two or more virtual machines concurrently (e.g., in corresponding time slices, in parallel on one or more processor cores, etc.). In such computing devices, each virtual machine may have access to hardware resources that are allocated exclusively for the use of the virtual machine. For example, each virtual machine may be allocated a corresponding region of a memory in a computing device for the exclusive use of the virtual machine. In these computing devices, a first virtual machine may be prevented from accessing a region of memory allocated to a second virtual machine and vice versa. In some of these computing devices, a hypervisor enforces access controls for each virtual machine. Hypervisors are software entities that operate/execute on computing devices and function as a manager or controller for virtual machines executing on the computing device. For example, hypervisors may start or initialize virtual machines, control accesses of computing device hardware by virtual machines, terminate or close virtual machines, etc.

Although hypervisors are assumed to provide access controls for virtual machines, a hypervisor may not always properly enforce the access controls. For example, the program code for a hypervisor may be replaced with malicious program code, a hypervisor's program code may become corrupted or include an error, etc. In such cases, a hypervisor may deliberately or unintentionally allow a virtual machine to access computing hardware allocated to another virtual machine. For example, in some computing devices, a hypervisor is responsible for providing address information to enable virtual machines to access data in corresponding areas of memory. In these computing devices, the hypervisor provides translations between local addresses used by virtual machines (or software executing thereon) and the physical addresses where data is actually located in memory. When the hypervisor is not functioning correctly, the hypervisor may provide incorrect address information, thereby directing virtual machines to access data in unexpected or unwanted areas of memory (e.g., areas of memory allocated to other virtual machines). By providing incorrect address information as described, a hypervisor can cause data to be accessed in violation of one or more access controls or rules.

BRIEF DESCRIPTION OF THE FIGURES

Throughout the figures and the description, like reference numerals refer to the same figure elements.

DETAILED DESCRIPTION

Figure 1:
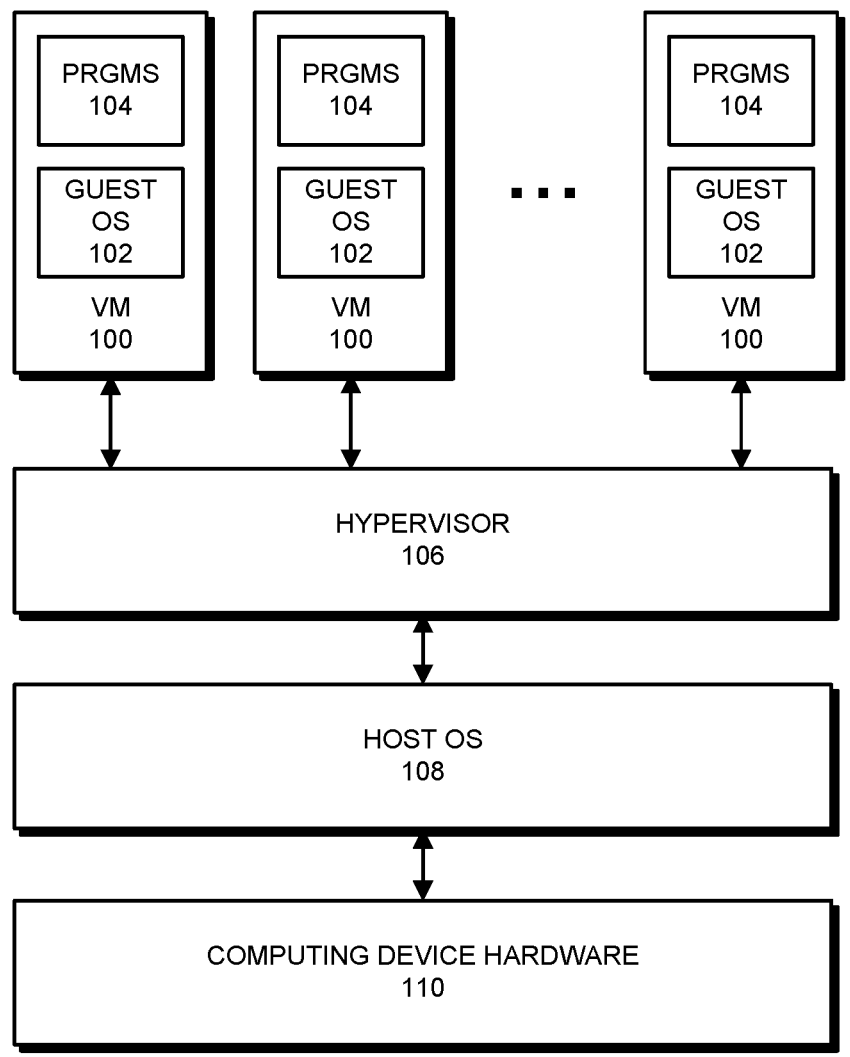
FIG. 1 presents a block diagram illustrating virtual machines and a hypervisor in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Virtual Memory

In the described embodiments, a computing device uses a virtual memory technique for handling data accesses by programs being executed in the computing device. For example, the executed programs may include applications, operating systems, device drivers, virtual machines, software/firmware executed by peripherals, etc. Generally, when data is accessed by a program in the computing device, a block or page of memory of a given size (e.g., 4 kB, 2 MB, etc.) that includes the data is copied from mass storage (e.g., a disk drive or semiconductor memory) to an available physical location in a memory in the computing device or is newly created in the memory. In order to avoid programs being required to keep track of the physical locations of pages in memory, the computing device keeps track of the physical locations of the pages for the programs. The programs access memory using virtual addresses in virtual address spaces, which are local address spaces that are specific to corresponding programs, instead of accessing memory using addresses based on the physical locations of pages (or physical addresses). From a program's perspective, virtual addresses indicate the actual physical locations where data is stored in memory, and memory accesses are made by programs using the virtual addresses accordingly. The virtual addresses, however, may not map directly to the physical addresses of the physical locations where data is stored in pages in the memory. As part of keeping track the physical locations of pages, the computing device translates the virtual addresses used by the programs in memory access requests into the physical addresses where the data is actually located. The computing device then uses the physical addresses to perform the memory accesses for the programs.

In order to enable the above-described virtual address to physical address translations, the computing device includes a page table. The page table is a record stored in a memory of the computing device that includes an entry, or a page table entry, with virtual address to physical address translation information for pages of data that are stored in the memory. In other words, the page table includes mappings of virtual addresses to corresponding physical addresses. Upon receiving a request from a program to access memory at a given virtual address, the computing device acquires corresponding physical address information from the page table by performing a page table walk, during which the page table is searched for a page table entry that provides the physical address associated with the virtual address.

Because the above-described page table walks are relatively slow, it is desirable to avoid performing page table walks. The computing device therefore includes translation lookaside buffers (TLBs), which are local caches that are used for storing a limited number of copies of page table entries acquired during page table walks (or information based on page table entries). During operation, the computing device first attempts to acquire cached page table entries from the corresponding TLB for performing virtual address to physical address translations. When the copy of the corresponding page table entry is not present in the TLB (i.e., when a miss occurs), the computing device performs a page table walk to acquire the desired page table entry—and caches a copy of the acquired page table entry in the TLB.

Virtual Machines, Hypervisors, and Hierarchical Page Tables

In the described embodiments, a computing device executes virtual machines, which are software entities that emulate or otherwise interface with the hardware of the computing devices in order to provide support for executing software programs. For example, a virtual machine may use hardware elements in a computing device (processors, memories, network interfaces, etc.) to provide support for running one or more instances of operating systems, called guest operating systems. The guest operating systems in turn provide support for executing other software programs such as applications, databases, etc.

In the described embodiments, the computing device may execute two or more virtual machines concurrently (e.g., in corresponding time slices, in parallel on one or more processor cores, etc.). In these embodiments, each virtual machine may be associated with various hardware resources that are allocated for the virtual machine's use. For example, each virtual machine may be provided with exclusive access to allocated region(s) of memory (e.g., contiguous or non-contiguous blocks of memory). In other words, a first virtual machine may be prevented from accessing pages of data in regions of memory associated with a second virtual machine and vice versa. In the described embodiments, a hypervisor enforces access controls for each virtual machine. A hypervisor is a software entity that operates or executes on the computing device and functions as a manager or controller for the virtual machines executing on the computing device. For example, the hypervisor may start or initialize virtual machines, control accesses of computing device hardware by virtual machines, terminate or close virtual machines, etc.

FIG. 1 presents a block diagram illustrating virtual machines and a hypervisor in accordance with some embodiments. As can be seen in FIG. 1, there are three virtual machines (VM) 100, each of which executes a guest operating system (GUEST OS) 102 and one or more programs (PRGRMS) 104, such as databases, software applications, etc. The virtual machines 100 communicate with a hypervisor 106, which interfaces between a host operating system (HOST OS) 108 and the virtual machines 100. Host operating system 108 provides an interface between computing device hardware 110 and hypervisor 106. Although various elements are presented in FIG. 1, in some embodiments, different arrangements of elements are present. For example, in some embodiments, host operating system 108 is not present and hypervisor 106 communicates more directly with computing device hardware 110. As another example, a different number of virtual machines 100 may be present.

In the described embodiments, both the guest operating systems and the hypervisor use the above-described virtual memory technique. A hierarchy of page tables is therefore maintained in the computing device. Within the hierarchy of page tables, each guest operating system (or corresponding virtual machine) is associated with a local page table (a guest page table) and the hypervisor is associated with a nested page table. Generally, upon receiving a request from a processor for a translation from a virtual address used by a program executing under a guest operating system to a system physical address, a hardware table walker (i.e., a circuit configured to perform page table walks) uses the guest page table and the nested page table to perform the translation. More specifically, the table walker uses the guest page table to translate the virtual address used by the program into a guest physical address, which is an address that is local to the guest operating system (or corresponding virtual machine). Because the guest physical address may not map directly to a location in memory where data (or an instruction, etc.) to be accessed by the program is stored, the table walker uses the nested page table to translate the guest physical address into a system physical address, which is an address that indicates the actual location in memory where the data is stored. Upon acquiring the system physical address, the table walker provides the system physical address for use in accessing the data, and may also cache the system physical address in a TLB.

In the described embodiments, the hypervisor can perform various operations on information in the nested page table. For example, hypervisor can update (i.e., overwrite) mappings from guest physical addresses to system physical addresses, etc. As described below, the described embodiments perform operations to ensure that information in the nested page table has not been changed by the hypervisor (maliciously, erroneously, etc.) in such a way that incorrect mappings/translations are provided by the hypervisor.

Overview

The described embodiments include mechanisms for controlling access by virtual machines to pages in a memory in a computing device. More specifically, the described embodiments include a reverse map table that is used to ensure that, among other things, a hypervisor (and/or another entity in the computing device) has not remapped translations from guest physical addresses to system physical addresses in the nested page table. The reverse map table includes information that can be used to determine, among other things, whether a system physical address acquired during a table walk of a nested page table for a guest physical address matches a previously-used system physical address. In other words, the reverse map table can be used to ensure that a system physical address for a given page in memory is matched to only one guest physical address at a time.

In some embodiments, the reverse map table is used in page validation operations that help to protect virtual machines from malicious, inadvertent, and/or unexpected remapping of page table entries. In these embodiments, virtual machines update, or "validate," entries in the reverse map table for pages by setting validation information in the entries. For example, in some embodiments, a virtual machine executes an instruction to set one or more validated bits in an entry in the reverse map table, thereby marking the entry as validated. The validation information is then removed from the entries, e.g., validated bits are cleared, when information in entries in the reverse map table is changed by a hypervisor (or another entity). For example, when changing virtual address to physical address mappings in the reverse map table at the behest of the hypervisor, the computing device also clears/unsets the one or more validated bits. In this way, a change of the information in the entry in the reverse map table can subsequently be noticed by the respective virtual machine when an entry is not marked as validated when the respective virtual machine expects the entry to be marked as validated.

In some embodiments, the reverse map table includes permission information that is used to control access to pages by virtual machines. In these embodiments, there are two or more different permissions levels associated with pages of memory, each permissions level being associated with a set of permissions that are provided to virtual machines that are assigned a corresponding permissions level. For example, in some embodiments, each set of permissions has particular permissions (e.g., permitted/not permitted, etc.) associated with each operation type of a set of operation types (e.g., read, write, execute, and/or other types of operations). In these embodiments, the reverse map table includes, in entries for pages, indications of the permissions associated with each permissions level, such as a bit string with bits set to zero/one to indicate that corresponding permissions are not provided/are provided for virtual machines having the respective permissions level. In these embodiments, the permission information for a page in an entry in the reverse map table can be used to prevent undesired accesses of the page by virtual machines.

In some embodiments, when translating a guest physical address into a system physical address based on an access request from a virtual machine, a hardware table walker performs a table walk of the nested page table to acquire, from a corresponding entry in the nested page table, the system physical address. It is unknown whether the nested page table, and thus the corresponding entry, has been modified, and so it is unknown whether the system physical address is properly mapped to the guest physical address in the corresponding entry. The table walker, therefore, upon acquiring the system physical address from the corresponding entry, performs various checks in the reverse map table to ensure that the system physical address is properly mapped to the guest physical address and that the requesting virtual machine is permitted to access the page. One of the checks performed by the table walker is a check of whether an entry in the reverse map table corresponding to the system physical address has a recorded guest physical address that matches the guest physical address from the request. When the guest physical address recorded in the reverse map table does not match the guest physical address from the request, and thus the system physical address is improperly mapped to the guest physical address in the nested page table, the table walker fails the translation and asserts a fault or otherwise handles the failure. On the other hand, when the guest physical addresses match, the system physical address is properly mapped to the guest physical address in the nested page table. When the system physical address is properly mapped, the outcome of one or more other checks of the information in the reverse map table are used to determine whether the system physical address is to be provided for use in performing the requested access for the virtual machine, as described below.

In some embodiments, another check that is performed in the reverse map table is checking the validation information, e.g., the validation bit(s), in the entry in the reverse map table. In these embodiments, the table walker determines if the validation information indicates that the virtual machine has validated the entry. If not, e.g., if the validation bit(s) are unset/cleared, the page table walker halts/fails the translation and asserts, to the requesting virtual machine, a validation fault. Upon receiving a validation fault for a page that is recorded in the local record of the virtual machine as having been previously validated, the virtual machine may refuse to revalidate (and thus refuse to use information from) the entry in the reverse map table—thereby avoiding using a page that may have been remapped. Otherwise, e.g., if the validation bit(s) are set, the table walker determines that the virtual machine has validated the entry. The table walker then determines, possibly based on the outcome of one or more additional checks, that the system physical address can be provided for use in performing the requested access for the virtual machine.

In some embodiments, another check that is performed in the reverse map table is checking permissions information in the entry in the reverse map table. In these embodiments, address translation requests include an indication of an operation type that is to be performed in or with the page (from among operation types such as read, write, etc.). The table walker checks to ensure that virtual machines having the virtual machine's permissions level are permitted to perform the operation type in or with the page. For example, when a virtual machine having a given permissions level attempts a write access in a page, the table walker can check the set of permissions associated with the permissions level in the corresponding entry in the reverse map table to determine whether virtual machines having the given permissions level has write permission for the page. The table walker, upon encountering a request to perform an operation type from a virtual machine that lacks a corresponding permission, halts/fails the translation and asserts, to the hypervisor, a permission fault. Upon receiving a permission fault, the hypervisor performs a remedial action. Otherwise, upon encountering a request from a virtual machine that has a corresponding permission, the table walker determines that the virtual machine is allowed to continue the operation. The table walker then determines, possibly based on the outcome of one or more additional checks, the system physical address can be provided for use in performing the requested access for the virtual machine.

By using the reverse map table, the described embodiments enable the detection of potentially malicious or erroneous modifications of the nested page table. Avoiding such modifications of the nested page table can improve the security of data for virtual machines in the computing device by avoiding the hypervisor (and/or another entity) improperly remapping guest physical addresses to system physical addresses to direct virtual machines to access (e.g., overwrite, execute, etc.) data in unknown, unwanted, or incorrect areas of memory (including areas of memory allocated to other virtual machines). In other words, the described embodiments can improve security of data by enforcing rules such as: each page in memory is only permitted to be associated with a single/unique guest physical address (no guest physical address aliasing is allowed), and in-use private guest pages cannot be remapped without involving/informing the corresponding virtual machine as described herein. In addition, alone or in combination with other techniques, such as encryption of virtual machine memory regions and protection for virtual machine processor state (e.g., registers, etc.), the described embodiments can avoid the need for implicit trust in hypervisors, which can simplify administration, improve security, etc. for computing devices. The described embodiments can therefore improve the security, operational stability, and value to consumers of computing devices.

Computing Device

Figure 2:
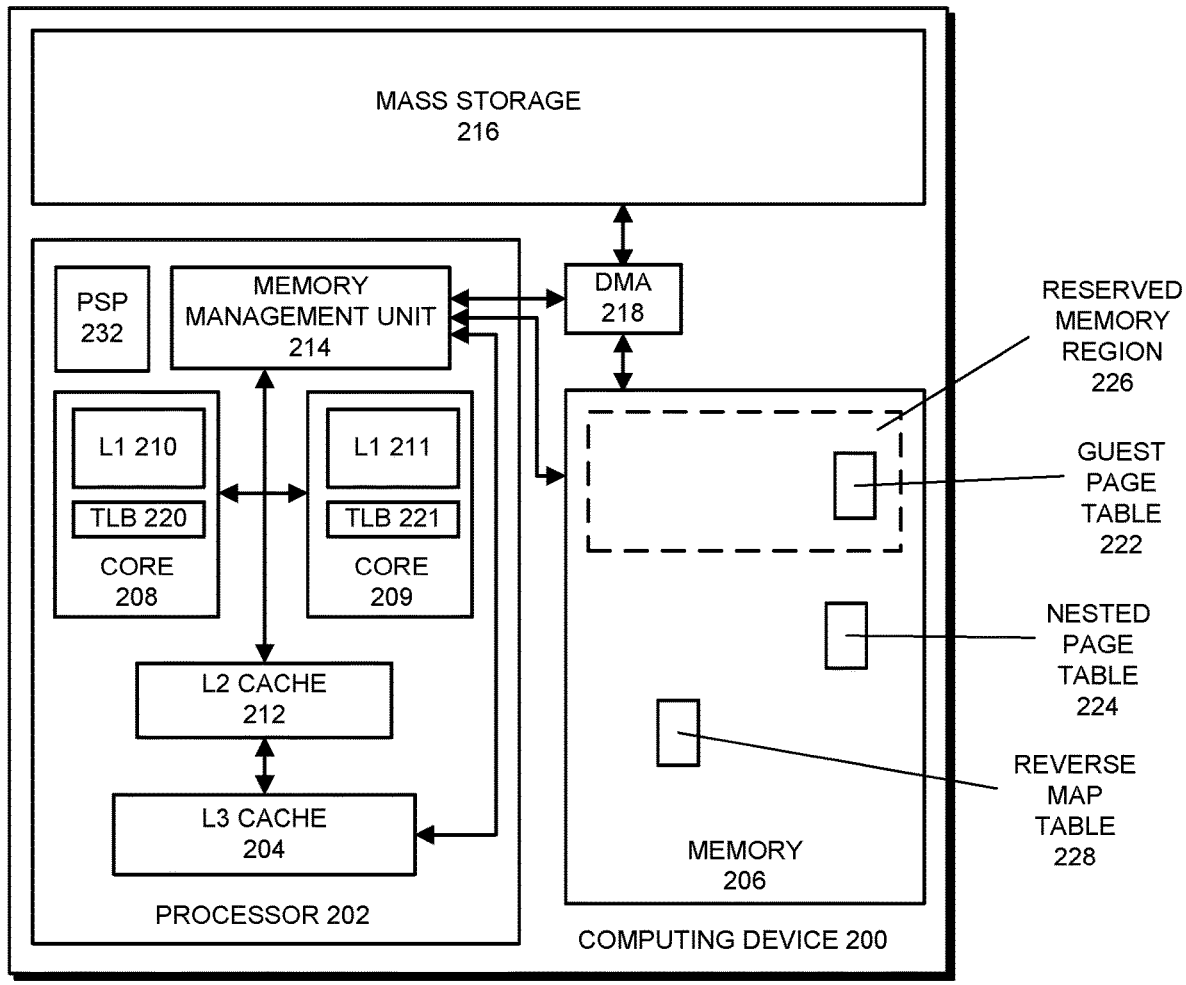
FIG. 2 presents a block diagram illustrating a computing device in accordance with some embodiments.

FIG. 2 presents a block diagram illustrating a computing device 200 in accordance with some embodiments. As can be seen in FIG. 2, computing device 200 includes processor 202, memory 206, mass storage 216, and direct memory access mechanism (DMA) 218. Processor 202 is a device that performs computational operations in computing device 200. Processor 202 includes two cores, cores 208 and 209, each of which includes one or more computational mechanisms such as central processing units (CPUs), graphics processing units (GPUs), embedded processors, application specific integrated circuits (ASICs), and/or other computational mechanisms.

Processor 202 also includes cache memories (or caches) that are used for locally storing data and instructions that are used by cores 208 and 209 for performing computational operations. As can be seen in FIG. 2, the caches in processor 202 include level-one (L1) caches 210 and 211 (L1 210 and L1 211) in each of cores 208 and 209. Each L1 cache includes memory circuits such as one or more of static random access memory (SRAM), dynamic random access memory (DRAM), double data rate synchronous DRAM (DDR SDRAM), and/or other types of memory circuits for storing data and instructions for use by the corresponding core 208 and 209, as well as control circuits for handling accesses of the data and instructions that are stored in the memory circuits. Processor 202 additionally includes a shared level-two (L2) cache 212 that includes memory circuits such as one or more of SRAM, DRAM, DDR SDRAM, and/or other types of memory circuits for storing data and instructions for use by both cores 208 and 209, as well as control circuits for handling accesses of the data and instructions that are stored in the memory circuits. Processor 202 further includes a shared level-three (L3) cache 204 that includes memory circuits such as one or more of SRAM, DRAM, DDR SDRAM, and/or other types of memory circuits for storing data and instructions for use by both cores 208 and 209, as well as control circuits for handling accesses of the data and instructions that are stored in the memory circuits.

Processor 202 further includes platform security processor (PSP) 232. Platform security processor 232 comprises a processor core, an ASIC, and/or other functional block(s) for performing security operations in computing device 200. Generally, platform security processor 232 is known to be secure against malicious or erroneous behavior of hardware and software entities, and thus can be used within computing device 200 for securing operations that are susceptible to such behavior. For example, platform security processor 232 may perform operations associated with enabling a trusted execution environment in computing device 200, such as performing encryption operations (e.g., key generation, encryption/decryption of data, etc.), registration and/or authentication of hardware and software entities, etc. In some embodiments, platform security processor 232 performs at least some of the operations described herein for controlling access by virtual machines to pages in memory 206 in computing device 200.

Memory 206 is the main memory of computing device 200, and includes memory circuits such as one or more of DRAM, DDR SDRAM, non-volatile random access memory (NVRAM), and/or other types of memory circuits for storing data and instructions for use by functional blocks in computing device 200, as well as control circuits for handling accesses of the data and instructions that are stored in the memory circuits. Virtual machines executed by computing device may have corresponding regions of memory allocated for the exclusive use of the virtual machines, so that a given virtual machine is the only virtual machine that should be accessing data in the corresponding region.

Mass storage 216 is a mass-storage device such as a high-capacity semiconductor memory (a non-volatile semiconductor memory such as a flash memory, an NVRAM, etc.), a disk drive (hard drive, etc.), an optical drive, etc. that stores data and instructions for use in computing device 200. In the described embodiments, mass storage 216 holds data and instructions that are acquired to be stored in memory 206 for subsequent use by functional blocks in computing device 200. For example, data and/or instructions may be retrieved from mass storage 216 in blocks or pages of a given size (e.g., 4 kB, 2 MB, 1 GB, etc.) and the pages can be stored in memory 206. In addition, pages may be newly created at an available physical location in memory 206 (e.g., for storing computational results, etc.). Pages retrieved from mass storage 216 for storage in memory 206 may be reserved for the exclusive access of a particular virtual machine or may be shared between virtual machines.

Memory management unit 214 is a functional block that handles memory access requests in processor 202. When data and instructions are to be accessed by a functional block in processor 202 (i.e., read, written, checked/verified, deleted, invalidated, etc. by core 208 or another functional block), the functional block sends a memory access request to memory management unit 214. Memory management unit 214 then sends a corresponding request to one or more of L2 cache 212, L3 cache 204, and memory 206 for satisfaction/resolution of the memory access request. For example, if data is to be retrieved based on the memory access request, memory management unit 214 may acquire the data from L2 cache 212, L3 cache 204, or memory 206 (or mass storage 216, should the data not be present in one of L2 cache 212, L3 cache 204, or memory 206) and forward the data to the requesting functional block.

In some embodiments, memory management unit 214 includes a hardware table walker, i.e., a table walker functional block. The table walker functional block includes circuit elements that perform the operations herein described.

As described above, computing device 200 uses virtual memory to enable software programs (e.g., executed by cores 208 and 209) to access memory using virtual addresses that must be translated into physical addresses. Upon receiving a memory access request from a program with a virtual address, memory management unit 214, e.g., a table walker functional block in memory management unit 214, performs operations for translating the virtual address into the physical address for the pages where data is located in memory 206.

In some embodiments, memory management unit 214 uses two mechanisms for performing virtual address to physical address translations. The first of the mechanisms is a hierarchy of page tables that includes a page table associated with each virtual machine and a page table associated with the hypervisor. Examples of the page tables are shown in FIG. 2 as guest page table 222 and nested page table 224, which are associated with a virtual machine and hypervisor, respectively. Each page table is a data structure (e.g., one or more tables, an array, a list, etc.) that is stored in memory 206. For example, a guest page table 222 may be stored in a memory region, such as reserved memory region 226 that is allocated for the exclusive access of a corresponding virtual machine. In some embodiments, a given page table stores at least one translation for each page present in memory 206 that was stored in memory 206 by a corresponding program, virtual machine, etc. Thus, in these embodiments, if a page has been copied from mass storage 216 to memory 206 or newly created in memory 206 and remains available in memory 206, an associated virtual address to physical address translation should exist in a corresponding page table. As described above, the table walker uses guest page table 222 and nested page table 224 to perform virtual address to physical address translations.

The second of the mechanisms for performing virtual address to physical address translations is translation lookaside buffers 220 and 221 (TLB 220 and TLB 221), which are caches in each of core 208 and 209 that are configured to store/cache virtual address to physical address translation information acquired during page table walks. Cores 208 and 209 acquire virtual address to physical address translation information from the corresponding TLB 220 and 221, when possible, to avoid performing a page table walk.

Direct memory access mechanism 218 is a functional block that is configured to perform transfers of data from mass storage 216 to memory 206 and vice versa. Generally, direct memory access mechanism 218 offloads data transfer operations from processor 202, which enables processor 202 to avoid performing some of the computational work involved with performing memory transfers.

Computing device 200 includes reverse map table 228 stored in memory 206. Reverse map table 228 is a data structure (e.g., a table, a list, etc.) that includes a number of entries, one entry for each page of memory in memory 206 that may be allocated for the use of one or more virtual machines. For example, if a memory 206 includes 32 GB of memory that may be allocated in 4 kB pages to virtual machines, reverse map table includes 8,388,608 entries. Reverse map table 228 is used by the hypervisor and other entities for keeping records that include information indicating guest physical addresses that are associated with system physical addresses, of sets of permissions associated with permissions levels for accessing virtual machines, of validations of pages by virtual machines, of immutable pages, and/or of other information associated with corresponding pages. In this way, computing device 200 maintains a record that can be used to detect when changes are made to the nested page table and otherwise protect pages of memory from impermissible accesses by virtual machines. Reverse map table 228 is described in more detail below.

In some embodiments, the hypervisor is prevented from directly accessing reverse map table 228. For example, reverse map table 228 may be stored in memory region(s) to which the hypervisor does not have direct access and/or may be marked as immutable in reverse map table 228 (i.e., the page(s) in which reverse map table 228 is stored in memory may themselves be marked as immutable). As another example, reverse map table 228 may be encrypted into a form that is not directly decryptable by the hypervisor. In some embodiments, reverse map table 228 is stored in a region of memory that is not directly accessible to the hypervisor and encrypted. Although no "direct" access is permitted to reverse map table 228 by the hypervisor, the hypervisor may cause other elements or entities in computing device 200 (such as processors, etc.) to perform operations on the tables and using the information in tables. For example, dedicated instructions may be supported that enable the hypervisor (and other entities) to cause computing device 200 to update entries in reverse map table 228. Such operations are described below.

In some embodiments, communication paths (that include one or more busses, wires, guides, and/or other connections) are coupled between the various functional blocks in computing device 200 (processor cores 208 and 209, memory management unit 214, memory 206, etc.), as shown by arrow-headed lines between the elements. The communication paths are used to transmit commands, data, control signals, and/or other information between the functional blocks.

Although embodiments are described with a particular arrangement of cores, some embodiments include a different number and/or arrangement of cores. For example, some embodiments have only one core, while other embodiments have two, five, eight, or another number of cores. Generally, the described embodiments can use any arrangement of cores that can perform the operations herein described.

Although embodiments are described with a particular arrangement of caches, some embodiments include a different number and/or arrangement of caches. For example, some or all of the caches (e.g., L1 cache 210 and 211, etc.) may be divided into separate instruction and data caches. Additionally, L2 cache 212 may not be shared, and hence may only be used by a single core (i.e., there may be two L2 caches in processor 202). As another example, some embodiments include different levels of caches, from only one level of cache to multiple levels of caches, and these caches may be located in processor 202 and/or external to processor 202. Generally, the described embodiments can use any arrangement of caches that can perform the operations herein described.

Although computing device 200 and processor 202 are simplified for illustrative purposes in FIG. 2, in some embodiments, computing device 200 and/or processor 202 include additional or different elements and mechanisms for performing the operations herein described and other operations. For example, computing device 200 and/or processor 202 may include power controllers, batteries, media processors, input-output mechanisms, communication mechanisms, networking mechanisms, display mechanisms, etc.

Processor 202, memory 206, mass storage 216, and direct memory access mechanism 218 are some examples of "hardware" that may be represented by computing device hardware 110 in FIG. 1. In some embodiments, therefore, host operating system 108 and/or hypervisor 106 interface between processor 202, memory 206, mass storage 216, and direct memory access mechanism 218 and virtual machines 100, guest operating systems 102, and programs 104. In these embodiments, computing device 200 (e.g., cores 208-209, etc.) executes hypervisor 106, virtual machines 100, guest operating systems 102, and programs 104, as well as host operating system 108, in embodiments in which host operating system 108 is present. In addition, references to "the computing device" and elements within the computing device in this description may refer to computing device 200 and the associated elements.

Computing device 200 can be, or can be included in, any electronic device that performs computational operations. For example, computing device 200 can be, or can be included in, electronic devices such as desktop computers, laptop computers, wearable computing devices, tablet computers, smart phones, servers, artificial intelligence apparatuses, virtual or augmented reality equipment, network appliances, toys, audio-visual equipment, home appliances, controllers, vehicles, etc., and/or combinations thereof.

Page Table

Figure 3:
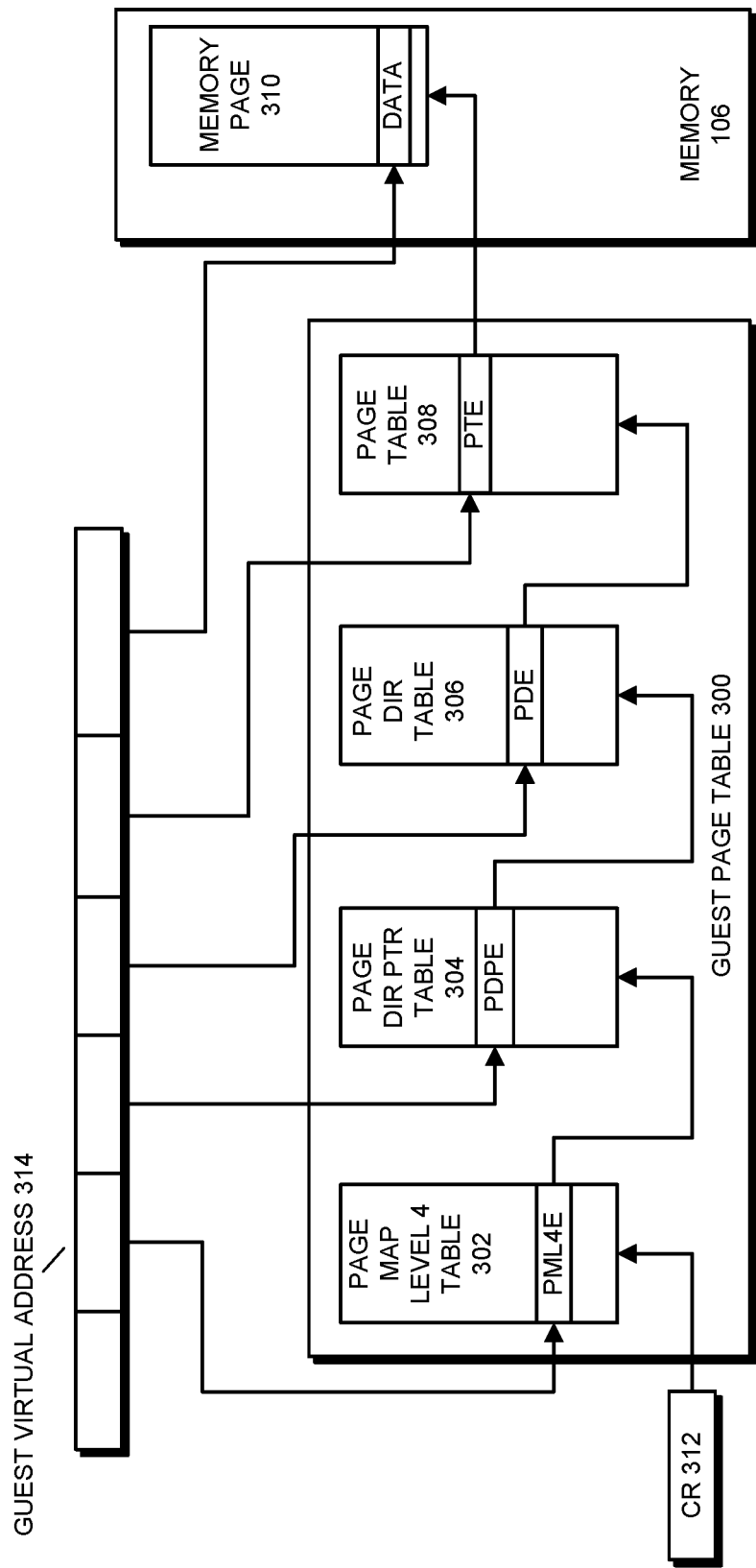
FIG. 3 presents a block diagram illustrating a set of tables used to implement a guest page table in accordance with some embodiments.

As described above, the computing device uses a hierarchy of page tables for performing address translations. FIG. 3 presents a block diagram illustrating a set of tables used to implement a guest page table in accordance with some embodiments. The nested page table can be implemented in a similar way to the arrangement of tables shown in FIG. 3.

As can be seen in FIG. 3, as can be seen in FIG. 3, guest page table 300 includes page map level 4 table 302, page directory pointer table (PAGE DIR PTR TABLE) 304, page directory table (PAGE DIR TABLE) 306, page table 308, and memory page 310. Page map level 4 table 302, page directory pointer table 304, page directory table 306, and page table 308 are data structures (e.g., tables, linked lists, etc.) that are stored in memory. Page map level 4 table 302, page directory pointer table 304, and page directory table 306 each include information about a subsequent table to be searched (or "walked") during a next step of a table walk to find a physical address corresponding to a virtual address 314. For example, page map level 4 table 302 includes a number of entries, each of which includes information mapping corresponding sub-sets of address bits from virtual address 314 to page directory pointer tables (such as page directory pointer table 304, as shown in FIG. 3). Guest page table 300 includes physical addresses indicating particular memory pages associated with corresponding portions of virtual addresses. Memory page 310 is a specific page in memory where data indicated by virtual address 314 is located.

In some embodiments, when performing a table walk in guest page table 300 to acquire a physical address that is associated with virtual address 314, a table walker reads control register (CR) 312 to determine a location, in memory, of a page map level table associated with the corresponding virtual machine (e.g., page map level 4 table 302). The table walker then searches (or walks) the page map level 4 table 302 using a sub-set of the bits from virtual address 314 (e.g., bits 39-47 of a 64-bit virtual address) for an entry (PML4E) indicating a location of a page directory pointer table to be walked next (e.g., page directory pointer table 304). The table walker next proceeds through the remaining tables, i.e., the page directory pointer table 304, a page directory table (e.g., page directory table 306), and a page table (e.g., page table 308), using corresponding sub-sets of bits from virtual address 314 to walk each table and locate an entry in the table (PDPE and PDE) that indicates a next table to be walked. Eventually, using a physical address acquired from the page table 308 (a page table entry or PTE), the table walker arrives at a particular memory page (e.g., memory page 310). Using a corresponding portion of bits of virtual address 314 (e.g., bits 0-11 of the 64-bit virtual address), the table walker determines an entry (DATA) in the memory page 310 that includes data indicated by virtual address 314. If the table walker is unable to find an address translation for virtual address 314, an error-handling operation is performed (e.g., a page fault is emitted and subsequently processed, etc.).

As described herein, address translation information may be legitimately and properly modified/changed, updated, etc. after being added to page tables. For example, when a page is moved from a first location to a second location in memory, re-assigned from a first virtual machine to a second virtual machine, etc., one or more tables in the set of tables can be updated accordingly. As another example, the hypervisor may improperly (maliciously, erroneously, etc.) update an address mapping in a page table, such as by writing incorrect information or old/outdated information in one or more tables in the set of tables. The described embodiments use a reverse map table to avoid using such improperly updated information from page tables. In other words, the described embodiments enforce rules such as each page in memory is only permitted to be associated with a single/unique guest physical address (no guest physical address aliasing is allowed), in-use private guest pages cannot be remapped without involving/informing the corresponding virtual machine, immutable pages cannot be written to by the hypervisor, pages without corresponding validated reverse map table entries cannot be used, and/or other software entities executing on cores 208-209, as described herein.

Although a particular arrangement of tables is shown in FIG. 3, in some embodiments a different number and/or arrangement of tables is used. For example, in some embodiments, only a single table is used, the single table mapping virtual addresses to physical addresses (or, e.g., virtual addresses to guest physical addresses, etc.).

Reverse Map Table

Figures 4, 5:
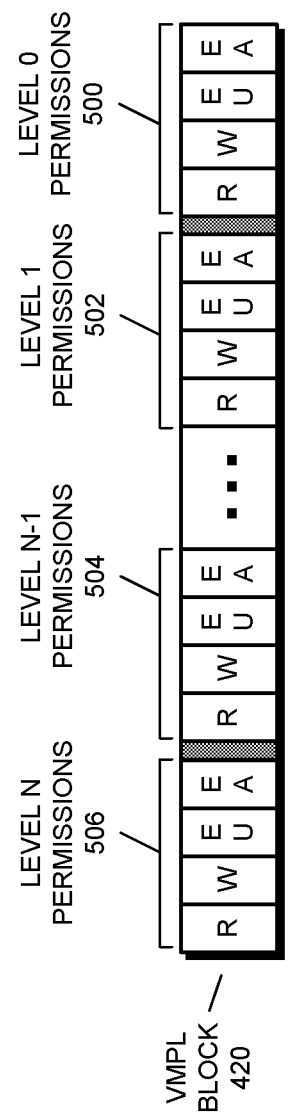
FIG. 4 presents a block diagram illustrating a reverse map table in accordance with some embodiments.
FIG. 5 presents a block diagram illustrating a virtual machine permissions level block in accordance with some embodiments.

As described above, reverse map table 228 includes information that is used, among other things, to determine whether a table walk of nested page table 224 for a guest physical address returns a system physical address that matches a previously-used system physical address. FIG. 4 presents a block diagram illustrating an expanded view of reverse map table 228 in accordance with some embodiments. Although reverse map table 228 is shown in FIG. 4 as including particular information, in some embodiments, a different arrangement or type of information may be present. Generally, the entries 400 in reverse map table 228 include sufficient information to perform the operations herein described.

As can be seen in FIG. 4, reverse map table 228 includes a number of entries 400 (an entry 400 is highlighted using a dashed line in FIG. 4). Each entry in reverse map table 228 includes information about a corresponding page in memory 206 (e.g., each 4 kB or 2 MB page in memory that may be allocated for use by one or more virtual machines). The entries in reverse map table 228 are indexed using system physical addresses associated with each page, so that each entry is associated with a particular system physical address. For example, for 4 kB pages, a first entry in reverse map table 228 may be associated with a first or lowest allocatable system physical address (address A), a second entry may be associated with a second allocatable system physical address (address A+4 kB), and so forth. In this way, when a particular system physical address is to be looked up in reverse map table 228, an entry at a corresponding offset in reverse map table 228 may be looked up. In some embodiments, a base address of reverse map table 228 is recorded in a specified, and possibly secure, location in computing device 200 to enable the offset-based lookups.

In reverse map table 228, each entry 400 is configured to store global shared pages indicator (GSP) 402, guest identifier (GUEST ID) 404, guest physical address (GUEST PHY ADDR) 406, sub-page count 408, size indicator 410, assigned indicator 412, lock indicator 414, immutable indicator (IMMT) 416, validated indicator 418, and virtual machine permissions level (VMPL) block 420.

Global shared pages indicator 402 is an indicator of whether the corresponding page is shared by two or more virtual machines. Generally, when a page is shared, that page may be accessed (typically read-only) by two or more virtual machines. Shared pages are described in more detail below.

Guest identifier 404 is an identifier associated with a virtual machine to which the corresponding page is allocated. For example, when the corresponding page is allocated for the use of a particular virtual machine, an identifier for the particular virtual machine is recorded in guest identifier 404. Guest identifier 404 may hold an address space identifier (ASID), an ID string, a name, and/or another value that identifies a virtual machine.

Guest physical address 406 is a value that represents a guest physical address that is associated with the system physical address for the entry. For example, when a page at a given system physical address is allocated for the use of a virtual machine, assigned to the virtual machine, etc., the guest physical address to be used by the virtual machine for addressing the page is recorded in the corresponding entry 400 in reverse map table 228. In this way, a record is made of the particular guest physical address to be used by the virtual machine for which each page is allocated. As described below, recording this information enables the table walker to determine, when checking a system physical address acquired during a walk of the nested page table, whether the system physical address maps to the expected guest physical address, i.e., whether the system physical address has been mapped to two different guest physical addresses at the same time. This can enable detecting whether the mapping has been changed maliciously or erroneously by a hypervisor or another entity.

Sub-page count 408 is a count of smaller-sized pages allocated for virtual machine(s) within a larger-sized page. For example, in a system that supports 2 MB pages and 4 kB pages, a page on a 2 MB boundary (e.g., pages at addresses A, A+2 MB, A+4 MB, etc.) can have a count of 4 kB pages within the 2 MB page that have been allocated for use by a virtual machine. The sub-page count value can be used to determine whether an access to a larger-sized page is impermissible, given that smaller pages have been allocated within the larger-sized page, i.e., to avoid an impermissible access made using an improper page size.

Size indicator 410 is an expected size for an access of a corresponding page. For example, assuming 4 kB pages and 2 MB pages are used in computing device 200, size indicator 410 can indicate which size of an access was requested. Size indicator 410 enables detection of impermissibly-sized accesses such as a 2 MB access of what is actually a 4 kB page.

Assigned indicator 412 is an indicator of whether the entry 400 is currently assigned to one or more virtual machines. Assigned indicator 412 is used to prevent the use of information from entries 400 in reverse map table 228 that are not presently allocated, but may still contain old information (undeleted information, random bit patterns, etc.), that are initialized, but do not contain actual information, etc. In some embodiments, assigned indicator 412 is set when a page is currently allocated to a virtual machine and is unset/cleared when the page is deallocated from the virtual machine.

Lock indicator 414 is an indicator of whether the entry 400 is locked. When lock indicator 414 is set, the entry 400 is considered to be locked, and when lock indicator 414 is unset/cleared, the entry 400 is considered to be free or available. Once the entry 400 has been locked by a given hardware or software entity, other hardware and software entities in computing device 200 are prevented from accessing the entry 400 (e.g., reading, writing/updating, etc. the entry 400). In contrast, any hardware and software entity can be permitted to access a free/available entry (possibly after setting lock indicator 414). For example, in an embodiment where lock indicator 414 is a single bit and is initially clear (e.g., set to zero), an entity may set lock indicator 414 (e.g., to 1), access the entry 400 one or more times, and then clear lock indicator 414 when finished accessing the entry 400. Using lock indicator 414, the described embodiments can avoid race conditions and other conditions where simultaneous reads and/or writes may occur for the entry 400.

Immutable indicator 416 is an indicator of whether the corresponding page is immutable. When a page is marked as immutable using the corresponding immutable indicator 416, the page cannot be written to by a software entity (e.g., hypervisor, guest operating system, application program, etc.) that is executing on a core (e.g., cores 208-209). In other words, an immutable page is prevented from being wholly or partially rewritten, updated, or amended, added to or removed from, etc. by any of the software entities. In addition, immutable pages are to be deallocated by a platform security processor (e.g., platform security processor 232), and cannot be deallocated by a core (e.g., cores 208-209), including a core acting on behalf of or under the control of a software entity executing thereon (e.g., a hypervisor, etc.). Immutable pages are described in more detail in U.S. patent application Ser. No. 15/417,632, which is, as described above, incorporated by reference herein.

Validated indicator 418 is an indicator of whether the entry 400 has been validated by a virtual machine (i.e., a virtual machine to which a corresponding page is allocated). Generally, a virtual machine updates validated indicator 418 (e.g., sets one or more bits of validated indicator 418) in the corresponding entry to indicate that the corresponding entry 400 is validated. For example, the virtual machine may immediately validate corresponding entries in reverse map table 228 upon being allocated pages, may validate entries when initially accessing pages, or may validate entries upon receiving validation faults for the pages (validation faults are described below). When validating an entry, the virtual machine updates the validated indicator 418 with a predetermined value, such as 1, that indicates that the entry has been validated. In some embodiments, the virtual machine executes a dedicated instruction to perform the validating/update validated indicator 418. During operation, the table walker determines, based on a state of validated indicator 418, whether or not the virtual machine has validated the corresponding entry and performs the operations herein described based on the determination.

Virtual machine permissions level (VMPL) block 420 includes sets of permissions for a number of permissions levels for the page associated with entry 400. In some embodiments, computing device 200 supports two or more permissions levels, each permissions level being associated with permissions (e.g., enabled/disabled, permitted/not permitted, etc.) for a specified set of operation types for pages in memory. The operation types can include any operation that may be performed on data in a page or with a page, such as reads of data, writes of data, execution of program code in pages, etc. For a given page, the set of permissions for each of the permissions levels may be different, so that a given operation type in a first permissions level may have a different permission than the same operation type in a second permissions level. For example, writes of data may be permitted in the first permissions level for a page, but not in the second permissions level. In some embodiments, the permissions levels are organized in a hierarchy, with "higher" permissions levels having more permissions than "lower" permissions levels.

FIG. 5 presents a block diagram illustrating an expanded view of virtual machine permissions level block 420 in accordance with some embodiments. In some embodiments, information such as that shown in FIG. 5 is incorporated into virtual machine permissions level block 420, such as being included in a number of bytes appended to or otherwise included with the other information in an entry 400 (i.e., global shared pages indicator 402, guest ID 404, etc.). Although a particular arrangement of permissions indicators is shown in FIG. 5, in some embodiments, different permissions information is included in virtual machine permissions block 420. For example, a different number of permissions levels may be supported, from two permissions levels to multiple permissions levels (as shown by the ellipsis in FIG. 5), or a different number or type of permissions may be included in each permissions level.

As shown in FIG. 5, the illustrated embodiments support N permissions levels 500-506 (which are shown separated by shaded segments for readability). Each permissions level includes a set of permissions having a number of permissions indicators. For example, the permissions indicators in each set of permissions may be individual bits that form a permissions "mask" for that level (i.e., a bit string or sequence). Within the set of permissions for each permissions level in FIG. 5 is a permissions indicator for read (R), write (W), execute-user (EU) (an indication of whether a virtual machine with "user" type access is/is not permitted to execute program code from a corresponding page), and execute-administrator (EA) operation types. It is possible, therefore, to separately indicate whether or not each of these operation types are permitted for each of permissions levels 500-506.

During operation, entities in the computing device may update the permissions mask for some or all of levels 500-506. For example, an operating system and/or another software entity or a hardware entity (e.g., platform security processor 232) may update a permissions mask at startup, when one or more events occurs (e.g., software program changes, operating state changes, user changes, etc.), at a specified interval, etc. When a given permissions mask is updated, some or all of the individual bit(s) of the given permissions mask are changed/overwritten. When subsequently checking the corresponding entry 400 in reverse map table 228, the table walker determines, based on the state of a respective bit in the set of permissions in a permissions level, whether a virtual machine having that permissions level is permitted to perform a requested operation type on the corresponding page.

Reverse Map Table Initialization

Figure 6:
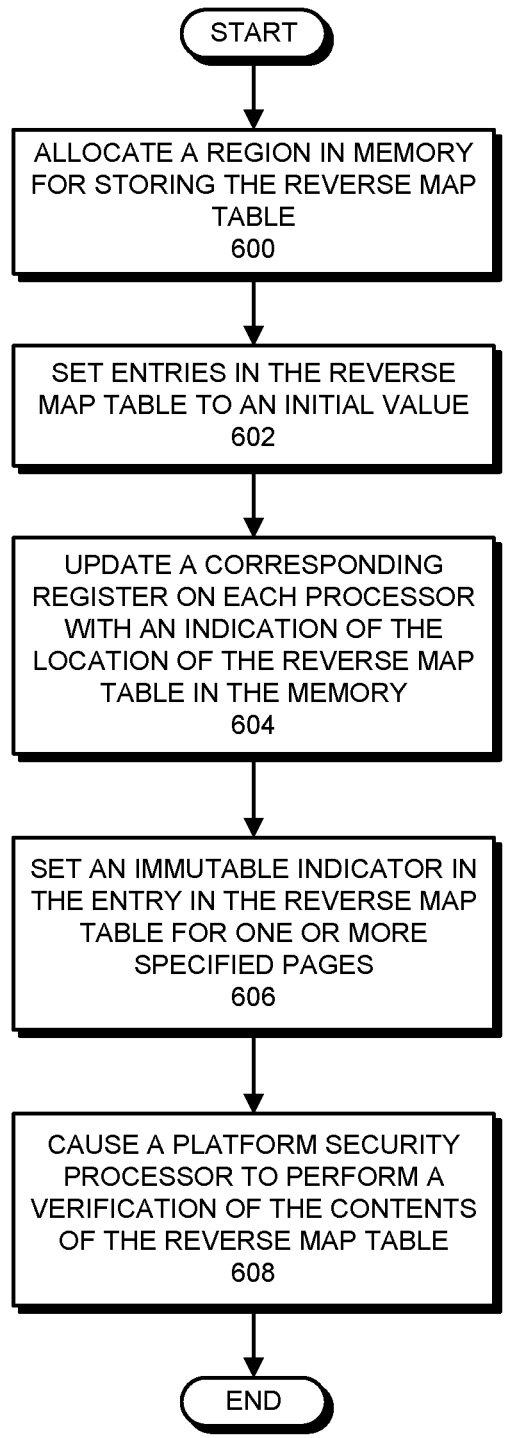
FIG. 6 presents a flowchart illustrating a process for initializing a reverse map table in accordance with some embodiments.

In some embodiments, as the computing device is being initialized (e.g., during a startup operation), reverse map table 228 is initialized. FIG. 6 presents a flowchart illustrating a process for initializing reverse map table 228 in accordance with some embodiments. The operations shown in FIG. 6 are presented as a general example of operations performed by some embodiments. The operations performed by other embodiments include different operations and/or operations that are performed in a different order. Additionally, although certain mechanisms/elements are used in describing the operations (e.g., a platform security processor, etc.), in some embodiments, other mechanisms perform the operations and/or the operations are performed on other mechanisms/elements.

The process shown in FIG. 6 starts when a software entity (e.g., an operating system, a hypervisor, etc.) allocates a region in memory for storing reverse map table 228 (step 600). For example, the software entity may perform one or more operations for finding and reserving, for reverse map table 228, a block or portion of the memory of a specified size. Note that, in some embodiments, and as described below, the size of the reverse map table depends on whether or not virtual machine permissions levels are enabled, with the reverse map table using more space (in terms of bytes used for storing the reverse map table in memory) when space for the virtual machine permissions level information is to be allocated in the reverse map table.

The software entity then sets entries in reverse map table 228 to an initial value (step 602). For example, the software entity may write zeros to each entry in reverse map table 228 in the allocated region in the memory. By setting the entries in this way, the software entity ensures that reverse map table 228 does not initially include information that may affect subsequent operations that depend on reverse map table 228. During this operation, in other words, the software entity creates reverse map table 228 in memory containing only the initial values.

The software entity next updates a corresponding register (or other memory location) on each core (e.g., cores 208-209) with an indication of the location (e.g., starting address and the size) of reverse map table 228 in the memory (step 604). In some embodiments, the register (or other memory location) is secured against updates during the subsequent operation of the computing device. For example, a dedicated register such as a machine state register (e.g., a register having a lock bit, etc.) in each core may be used to hold the indication of the location of reverse map table 228.

The software entity then sets an immutable indicator in a reverse map table entry for one or more specified pages (step 606). For example, the immutable indicator may be set (e.g., to 1 or another value) for entries associated with page(s) where reverse map table 228 itself is stored in the memory, for page(s) where virtual machine register state is to be stored, etc. During this operation, the software entity may execute one or more RMT_UPDATE commands to cause the setting of the specified immutable indicators in reverse map table 228. Recall that setting the immutable indicators as described prevents software entities (including the hypervisor, etc.) from subsequently updating the corresponding pages.

The software entity next causes the platform security processor to perform a verification of the contents of the entries in reverse map table (step 608). For example, the software entity may, at some point after initializing reverse map table 228, invoke an INIT function of the platform security processor, which causes the platform security processor to check reverse map table 228 to verify that the immutable indicator is set in the entries for the specified pages and that other entries in reverse map table 228 (i.e., aside from the entries for the specified pages) contain the initial value. If so, the platform security processor may complete the INIT operation without performing a remedial action, thereby freeing reverse map table 228 for use as herein described. Otherwise, the platform security processor may perform a remedial action (e.g., assert a fault or error, prevent guest operating systems from starting, etc.) when one or more entries are set to incorrect initial values. In this way, the platform security processor ensures that reverse map table 228 is in a correct state before allowing use of reverse map table 228.

In some embodiments, the platform security processor has other duties in addition to the above described checks on initialization of reverse map table 228. For example, in some embodiments, the platform security processor performs operations (e.g., encryption, packaging, etc.) relating to migrating pages between guest operating systems (or virtual machines) and transferring the state of the corresponding entries in reverse map table 228. As another example, in some embodiments, the platform security processor is responsible for deallocating pages that are marked as immutable—and may be the only entity that is permitted to deallocate such pages.

Updating the Reverse Map Table

Figure 7:
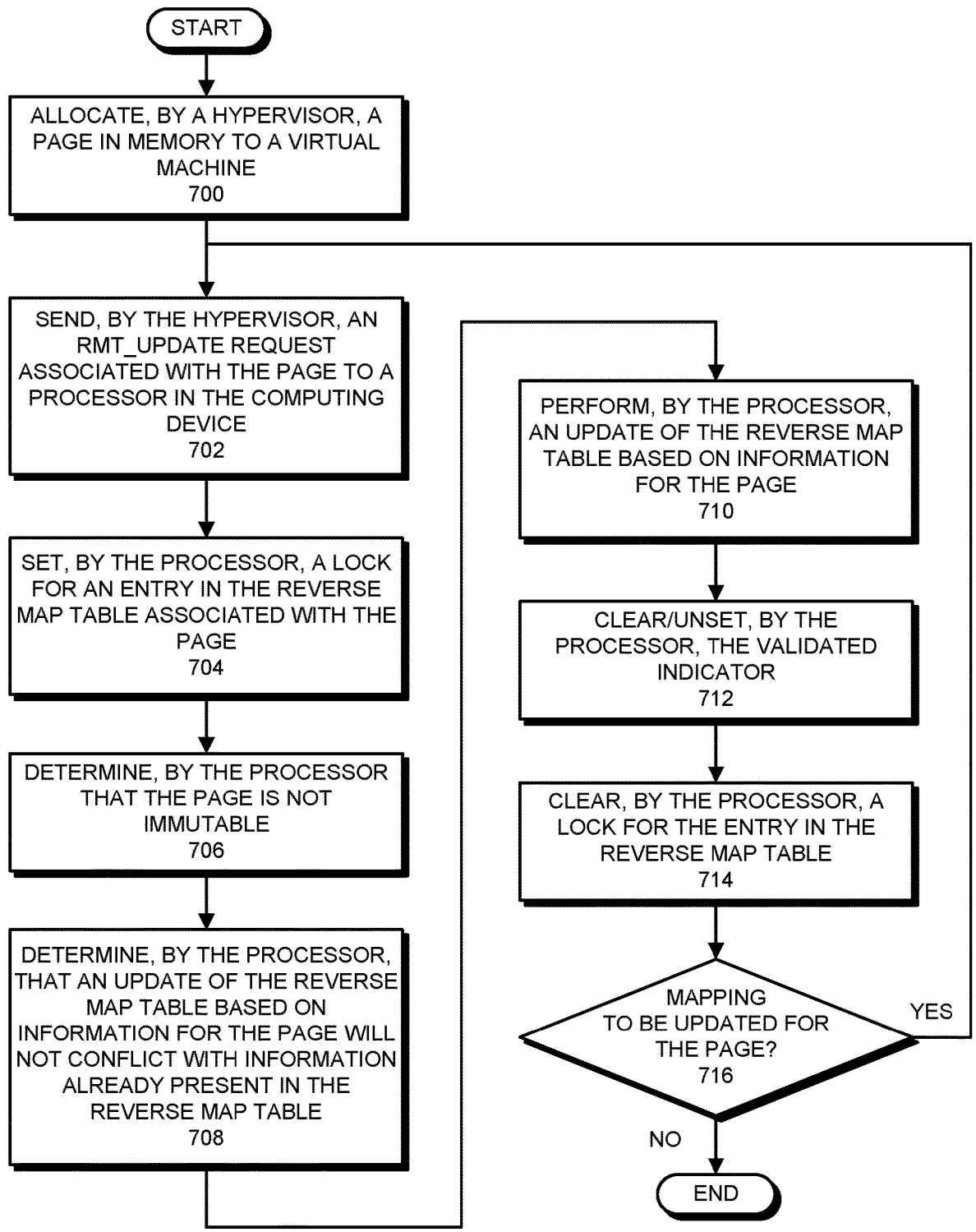
FIG. 7 presents a flowchart diagram illustrating a process for updating a reverse map table in accordance with some embodiments.

FIG. 7 presents a flowchart illustrating a process for updating reverse map table 228 in accordance with some embodiments. The operations shown in FIG. 7 are presented as a general example of operations performed by some embodiments. The operations performed by other embodiments include different operations and/or operations that are performed in a different order. Additionally, although certain mechanisms/elements are used in describing the operations (e.g., a hypervisor, etc.), in some embodiments, other mechanisms perform the operations and/or the operations are performed on other mechanisms/elements.

An example is provided in FIG. 7 in which a hypervisor updates, using an RMT_UPDATE request, an entry in the reverse map table. Generally, when updating the reverse map table, the processor in the computing device follows similar steps to those shown in FIG. 7, e.g., steps 702-714. In addition, although the update operation is described as being associated with the allocation of a corresponding page, the update operation is not limited to being used only when pages are allocated. Generally, the update operation can be performed any time that an entry in the reverse map table is to be updated. In other words, the operations of steps 702-714 may be performed when updating an entry in the reverse map table for a reason other than allocation of the corresponding page, such as deallocation of the page, updates of page properties, etc. This is illustrated in FIG. 7 using step 716, which presents a decision block for subsequent updates for the reverse map table.

The process shown in FIG. 7 starts when a hypervisor in a computing device allocates, to a virtual machine, a page in memory (step 700). For example, the hypervisor may allocate a particular page along with other pages in a region of memory when allocating the region of memory for the use of the virtual machine. The allocation may be performed when the virtual machine is newly initialized, during operation of the virtual machine as the virtual machine requests the allocation or creation of one or more pages, etc. During the allocation, the hypervisor may also update the nested page table with corresponding guest physical address to system physical address information.

Upon allocating the page, the hypervisor sends, to a processor in the computing device, an RMT_UPDATE request associated with the page (step 702). When sending the RMT_UPDATE request to the processor, the hypervisor may execute a corresponding instruction (e.g., a dedicated RMT_UPDATE instruction, etc.), access a particular register (e.g., a model-specific register, etc.), and/or use another mechanism. The RMT_UPDATE request causes the processor to perform operations for updating an entry in reverse map table 228 associated with the page of memory. In some embodiments, the RMT_UPDATE request includes sufficient information to enable the updating of the entry in reverse map table 228 without acquiring information from other sources (e.g., from the virtual machine, etc.). For example, the RMT_UPDATE request may include a system physical address where the page is located, a guest physical address to be used by the virtual machine for addressing the page, an identifier for the virtual machine, a page size, an indication of whether the page is shared, a request to mark the page as immutable, a request to lock the entry in reverse map table 228, permissions level information, and/or other information. In other embodiments, the processor acquires some or all of the information from another source. For example, before or while making the RMT_UPDATE request, the hypervisor and/or the virtual machine may write information about the page into a specified memory element (e.g., memory 206, a dedicated register, etc.) and the processor may read the memory element to acquire the information. As another example, the processor may request information from hypervisor and/or the virtual machine.

The processor then sets a lock for the entry in reverse map table 228 (step 704). During this operation, the processor sets the lock indicator in the entry to a value that indicates that the entry is locked, e.g., a 1 or another value. By setting the lock indicator in this way, the processor configures the entry so that no other hardware or software entity can update or otherwise modify the entry in reverse map table 228. In this way, the contemporaneous and possibly erroneous modification of the entry by two or more entities can be avoided, such as when an update race condition occurs between the entities.

The processor next determines that the page is not immutable (step 706). During this operation, the processor acquires the value of the immutable indicator from the entry in reverse map table 228 and determines whether the immutable indicator is set to a value that indicates that the page is immutable. For this example, it is assumed that the page is not immutable, and therefore can be written to as described above. If the entry was immutable, the processor would release the lock for the entry (e.g., set the lock indicator to 0) and fail the RMT_UPDATE operation, which may involve performing a remedial action.

The processor then determines that an update of the entry in reverse map table 228 based on the information for the page will not conflict with information already present in the reverse map table (step 708). For example, the processor may compare the size of the page to page sizes in one or more other entries to ensure that the information for the page does not describe a page that overlaps with one or more existing pages. For instance, the processor determines that information about a smaller page (e.g., 4 kB) will not to be written to an entry in reverse map table 228 for which the system physical address falls within a set of system physical addresses in use for a larger page (e.g., 2 MB) at another location in reverse map table 228. In other words, the processor determines that a smaller page does not overlap with a larger page or vice versa. If a conflict was detected, the processor may perform a remedial action such as raising a fault, signaling an error to the hypervisor and/or the virtual machine, etc.—and may fail the RMT_UPDATE operation, which may involve performing a remedial action.

The processor then performs an update of reverse map table for the page (step 710). During the update of reverse map table 228, the processor writes some or all of the above-described information (i.e., the system physical address, the guest physical address, the identifier for the virtual machine, the page size, permissions level information, etc.) about the page to corresponding fields in the entry of the reverse map table 228. When the update is complete, reverse map table 228 includes sufficient information in the entry for consumers of the information in the computing device (e.g., the table walker, etc.) to determine a guest physical address to which the system physical address for the entry maps, a particular virtual machine that has access to the page, etc. Note that updating the entry in reverse map table 228 may involve updating only a portion/subset of the information in the entry, such as updating particular bit(s) in the entry, or may involve updating all of the information in the entry, such as overwriting the entire entry (as described in steps 710-712).

When updating reverse map table 228, the processor clears/unsets the validated indicator for the entry (step 712). For example, the processor can set the validated indicator to 0, thereby marking the entry as having not yet been validated by the corresponding virtual machine. In this way, the processor configures the entry to indicate to consumers of the information that the entry in the reverse map table 228 has been updated. By performing the comparison described herein between the validated indicator and a local record of validated pages kept by the virtual machine (or when the virtual machine knows, without keeping the local record, that certain pages have been validated), clearing/unsetting the validated indicator as described can help to avoid a using incorrect mapping information (and/or other information from the entry) when the entry is unexpectedly changed.

In some embodiments, if the entry was previously valid, i.e., if the updating overwrites information that was already present in the reverse map table 228, the processor can flush related information from TLBs in the computing device (and may simply flush all information from the TLBs). In this way, the processor removes from the TLBs any stale copies of translation information associated with the system physical address and/or guest physical address.

In some embodiments, the processor updates sub-page counts for one or more entries when updating the entry in reverse map table 228. For example, for a given smaller page, the processor finds and updates an entry for one or more larger pages within which the smaller page may reside. For instance, when an entry is updated with information about a 4 kB page, the processor updates information for an entry for a larger page, which itself may not be allocated, to reflect that the region of the larger page includes a smaller page. In this way, the processor adds information to the table for simplifying the determination in step 704 that an update of reverse map table 228 based on the information for the page will not conflict with information already present in the reverse map table. That is, the processor sets the sub-page count so that updates for the entry for a larger page can be stopped using only the information from the sub-page count, without individually checking each corresponding smaller page entry in reverse map table 228.

After completing the update of reverse map table 228, the processor clears the lock for the entry in reverse map table 228 (step 714). During this operation, the processor clears the lock indicator in the entry to a value that indicates that the entry is not locked, e.g., a 0 or another value. By clearing the lock indicator in this way following the update, the processor reconfigures the entry so that other hardware or software entities can acquire the lock to enable updating the entry, reading information from the entry, etc.

During subsequent operation, the hypervisor determines whether a mapping for the page is to be updated (step 716). For example, the hypervisor assigns the page to a different virtual machine because the corresponding virtual machine is no longer using the page, thereby necessitating an update of the guest physical address associated with the existing system physical address. Upon making the determination, the hypervisor causes steps 702-714 to be performed to update the corresponding entry in reverse map table 228. As described above, during the updating, the processor writes some or all of the above-described information (i.e., the system physical address, the guest physical address, the identifier for the virtual machine, the page size, etc.) about the page to corresponding fields in the entry of the reverse map table. The processor also sets the validated indicator to 0 to indicate that the entry in the reverse map table 228 has been updated. When the mapping for the page is not to be updated (step 716), the process ends.

As shown in FIG. 7, the hypervisor and other entities do not have "direct" access to reverse map table 228 for updating entries. Instead, the hypervisor sends the RMT_UPDATE request and the processor handles the update as described above (including clearing the access indicator). By limiting the hypervisor's updating access to the reverse map table 228 to the RMT_UPDATE request as described, the described embodiments avoid the situation where the hypervisor maliciously, erroneously, etc. updates both the nested page table and the reverse map table 228, thereby possibly concealing an update of the nested page table.

In some embodiments, when the hypervisor is to terminate a particular virtual machine, the hypervisor reclaims the pages allocated to the virtual machine and subsequently re-allocates the pages by modifying the nested page table and reverse map table 228. Note that, in some embodiments, deallocating immutable pages is performed via a platform security processor. The platform security processor may provide an interface to software entities such as the hypervisor to enable the software entities to request the platform security processor to perform the deallocation of the pages.

Validation

In the described embodiments, virtual machines update validation information in the reverse map table, thereby "validating" the entries. By validating the entries, the virtual machines mark the corresponding pages as pages that may be (but are not required to be) accessed by the virtual machines.

In addition to updating validation information in the reverse map table, in some embodiments, virtual machines keep a local record of entries in the reverse map table that have been validated. For example, the local record of validated entries may be stored in a protected and/or encrypted portion of the memory allocated to the virtual machine, such as by storing, in a lookup table, linked list, or other data structure, an identifier for each entry (e.g., system physical address, etc.). When used in combination with the above-described process for updating the reverse map table (i.e., the RMT_UPDATE instruction), which includes clearing validation information in the reverse map table upon updating an entry, the local record of validated entries enables a virtual machine to determine that an update has occurred for a given entry that was previously validated. In other words, a difference between the local record and what is present in the reverse map table can show that the entry in the reverse map table was updated, possibly maliciously and/or erroneously. The virtual machine can then choose to re-validate the entry and use the entry as-is, or can perform one or more remedial actions, including refusing to re-validate the entry and/or use the translation, which can help to avoid using entries that may have been maliciously or erroneously updated.

In some embodiments, the above-described local record of entries in the reverse map table that have been validated is not kept by some or all of the virtual machines. For example, a virtual machine may automatically validate the entries in the reverse map table upon allocation of the corresponding pages. In this case, the virtual machine subsequently assumes that all entries in the reverse map table are validated and handles entries that are not marked as validated as described herein.

Figure 8:
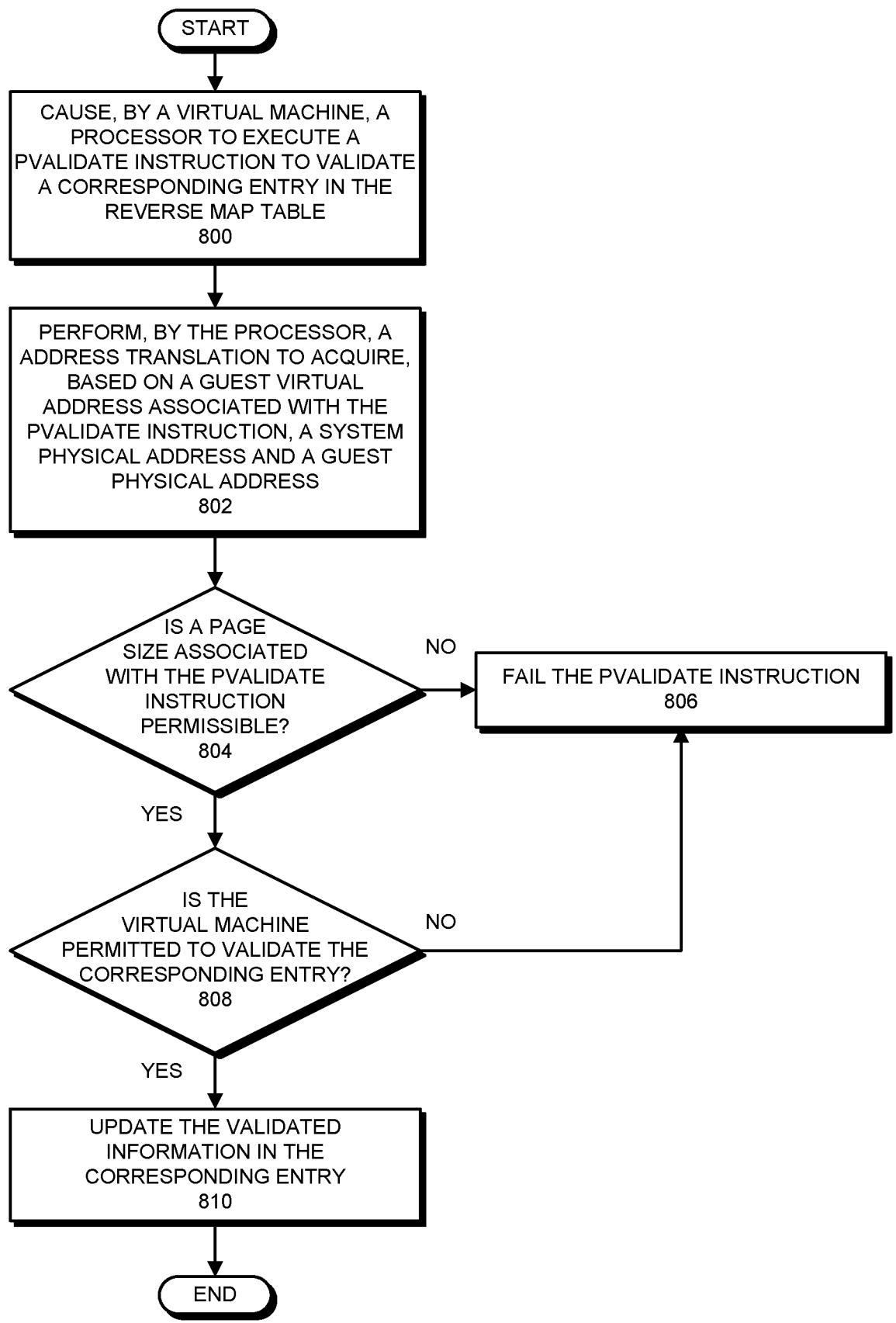
FIG. 8 presents a flowchart illustrating a process for executing a PVALIDATE instruction in accordance with some embodiments.

In some embodiments, a virtual machine executes (or, rather, causes a processor to execute) a dedicated PVALIDATE instruction in order to validate an entry. When executing a PVALIDATE instruction, the processor performs a number of operations that culminate in an update of a validated indicator in a corresponding entry in the reverse map table or a failure/error. FIG. 8 presents a flowchart illustrating a process for executing a PVALIDATE instruction in accordance with some embodiments. The operations shown in FIG. 8 are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements. For example, in some embodiments, the operations described as being performed when executing the PVALIDATE instruction are performed without requiring a dedicated instruction. For instance, in these embodiments, the input parameters may be written to reserved memory locations and the processor may, via an interrupt, hardware register (flag) value, or other mechanism, be caused to commence the described operations.

As can be seen in FIG. 8, the process starts when a virtual machine causes a processor to execute a PVALIDATE instruction (step 800). In some embodiments, the PVALIDATE instruction takes, as input parameters, the guest virtual address, a page size (e.g., 4 kB, 2 MB, etc.), and an validate/invalidate indicator, which are used as described below in subsequent operations. Executing the PVALIDATE instruction causes the processor to request a translation from the table walker for the guest virtual address, thereby acquiring the associated guest physical address and the system physical address (step 802).

The processor then checks the page size associated with the PVALIDATE instruction to ensure that the page size is permissible (step 804). Generally, during this operation, the processor checks to ensure that an improper page size is not included with the PVALIDATE instruction in order to avoid validating entries for incorrectly-sized pages. For example, the processor may confirm that the page size is properly aligned on page size boundaries and/or that that the page size in a corresponding entry in the reverse map table matches the page size. If the page-size check fails, the processor fails the PVALIDATE instruction (step 806). "Failing" the PVALIDATE instruction, as used herein, means that the processor halts or terminates further processing of the PVALIDATE instruction and may transmit a failure reason code or assert a specified fault to the requesting virtual machine.

When the page size is permissible, the processor checks various information in the corresponding entry in the reverse map table to determine whether the virtual machine is permitted to update the corresponding entry (step 808). Generally, this operation involves verifying that the virtual machine is permitted to update the validated indicator for the corresponding entry based on the particulars of the virtual machine and the entry itself. For example, the processor may check the lock indicator or the immutable indicator, and compare values such as the virtual machine's ID to the stored guest ID, the guest physical address to the stored guest physical address, etc. When the virtual machine is not permitted to update the corresponding entry, the processor fails the PVALIDATED instruction (step 806).

When the virtual machine is permitted to update the corresponding entry, the processor updates the corresponding entry (step 810). During this operation, the processor stores, in a validated indicator in the corresponding entry, a value, such as 1, X, or another value, that is designated to represent that the corresponding entry has been validated. In some embodiments, the processor also transmits, to the requesting virtual machine, a success message or value.

In some embodiments, in addition to the other operations in FIG. 8, the processor locks the entry in the reverse map table before performing the checks and the update (i.e., steps 804 and 808-810) using the lock indicator as described herein. In these embodiments, the processor selectively unlocks the entry upon failing the PVALIDATE instruction (i.e., will return the lock to the previous locked/unlocked state) or successfully updating the validated indicator in the corresponding entry.

In some embodiments, upon updating the corresponding entry in step 810, the processor informs the virtual machine whether or not the corresponding entry was changed. For example, when the validated indicator in the corresponding entry was already set to the above described value (1, X, etc.), the processor can set a processor flag to indicate, to the virtual machine (and other software entities) that the update was made to a validated indicator that was already set—i.e., the validated indicator was not changed from one value to another. As another example, when the validated indicator in the corresponding entry was unset/cleared (set to 0, K, etc.), the processor can set the processor flag to indicate, to the virtual machine (and other software entities) that the update was made to a validated indicator that was cleared—i.e., the validated indicator was changed from one value to another.

Although an example of the PVALIDATE instruction is provided in which the requesting virtual machine validates the entry in the reverse map table, operations for invalidating the entry are similar, with the exception of the outcome being that the validated indicator in the corresponding entry is cleared/unset (e.g., set to a specified value such as 0, B, or another value). In some embodiments, in order to invalidate an entry in the reverse map table, the virtual machine requests invalidation in the input parameters of the PVALIDATE instruction.

Virtual Machine Permissions levels

In the described embodiments, two or more permissions levels are used for determining and controlling the operation types that are permitted to be performed by virtual machines. As described above, pages in memory are associated with sets of permissions for each permissions level. Each set of permissions includes permissions for a number of different operation types, such as permitted/not permitted permissions for operation types such as read, write, execute, move, etc. In these embodiments, virtual machines are assigned a particular permissions level from among the permissions levels and therefore have the corresponding permissions for the operation types for pages. For example, a page may be associated with a first permissions level in which read accesses are allowed—and thus a virtual machine that is assigned the first permissions level is permitted read accesses.

In some embodiments, the reverse map table includes, in each entry, a set of permissions associated with each permissions level for a corresponding page. For example, each entry may include a permissions "mask" (e.g., a number of bits) for each permissions level that indicates the permissions (e.g., permitted/not permitted) for a number of operation types. Each set of permissions for a page may be set and updated separately from other sets of permissions for other permissions levels for the page.

In some embodiments, the set of permissions for some or all of the permissions levels for a given entry may be different than the set of permissions for the same permissions levels in other entries. In other words, the permissions levels can be set and updated separately for at least some of the entries in the reverse map table. In this way, the operation types that are allowed for individual pages may be controlled using the associated permissions level information in the reverse map table.

In some embodiments, virtual machines are assigned, and possibly reassigned, permissions levels at specified times. For example, in an embodiment with two permissions levels, a virtual machine may be assigned one of the permissions levels. In these embodiments, a virtual machine may be assigned a permissions level when the virtual machine starts, changes operating state, commences executing particular workloads, etc. The permissions level assigned to the virtual machine is then used for controlling the operation types that are allowed to be performed by the virtual machine for pages in memory as described herein. In some embodiments, each virtual machine is separately assigned a permissions level.

In some embodiments, the sets of permissions in the reverse map table override permissions information available in other places. For example, a page table entry for a particular page may indicate that the page is writeable, but if the set of permissions in a corresponding entry in the reverse map table indicates that writes are not permitted for a given permissions level, the table walker (or other entity) may prevent (via failing translation requests) virtual machines having the given permissions level from performing writes in the page.

In some embodiments, the individual permissions in the sets of permissions in the reverse map table are independent, so that having a particular permission does not grant other permissions. For example, having write permission does not automatically mean that reads are permitted, etc.

In some embodiments, virtual machines are configured hierarchically, with higher level virtual machines in the hierarchy being assigned more-privileged permissions levels than lower level virtual machines. In some of these embodiments, within the hierarchy of virtual machines, sets of permissions can be updated by higher level virtual machines to enable control of operation types that are (and are not) permitted to be performed by lower level virtual machines.

In some embodiments, a given virtual machine can be divided into two or more "sub" virtual machines and the sub virtual machines can be separately assigned permissions levels. For example, particular program code, routines, and/or other portions of the virtual machine may be included in a sub virtual machine, and assigned a given permissions level. In these embodiments, the permissions levels assigned to each sub virtual machine of a given virtual machine may be different. By dividing virtual machines into sub virtual machines and separately assigning permissions levels to the sub virtual machines as described, portions of virtual machines that are considered untrustworthy may be limited by using more restrictive permissions levels. As with the hierarchy of virtual machines described above, in some of these embodiments, sub virtual machines having higher permissions levels can be enabled to update sets of permissions for lower permission level sub virtual machines.

In some embodiments, in order to perform the above-described updates of sets of permissions for other virtual machines/sub virtual machines, higher permission level virtual machines/sub virtual machines update the reverse map table. Such updates, however, are limited to being made for sets of permissions for permissions levels lower than a permissions level of the updating virtual machines/sub virtual machines—and may be restricted in other ways, such as only being permissible for pages that are assigned to a particular virtual machine, etc. In these embodiments, a sub virtual machine having a highest or most permissive permissions level may be allowed to update sets of permissions for one or more (and perhaps all) lower permissions levels in entries in the reverse map table that are assigned to a corresponding virtual machine. In other words, a virtual machine/sub virtual machine having permissions level X (in a system where higher-numbered levels have more permissions) may alter execute permissions (and/or other permissions) in sets of permissions at permissions level X−1 or lower in entries in the reverse map table. A given virtual machine/sub virtual machine is not allowed to increase any permission level's set of permissions beyond the set of permissions associated with a current permissions level of the given virtual machine/sub virtual machine. In some of these embodiments, only already-validated entries, i.e., entries with the validated indicator already set, are allowed to have sets of permissions updated as described. In some embodiments, virtual machines/sub virtual machines use an RMT_ADJUST request to update sets of permissions in permissions levels in entries in the reverse map table.

Figure 9A:
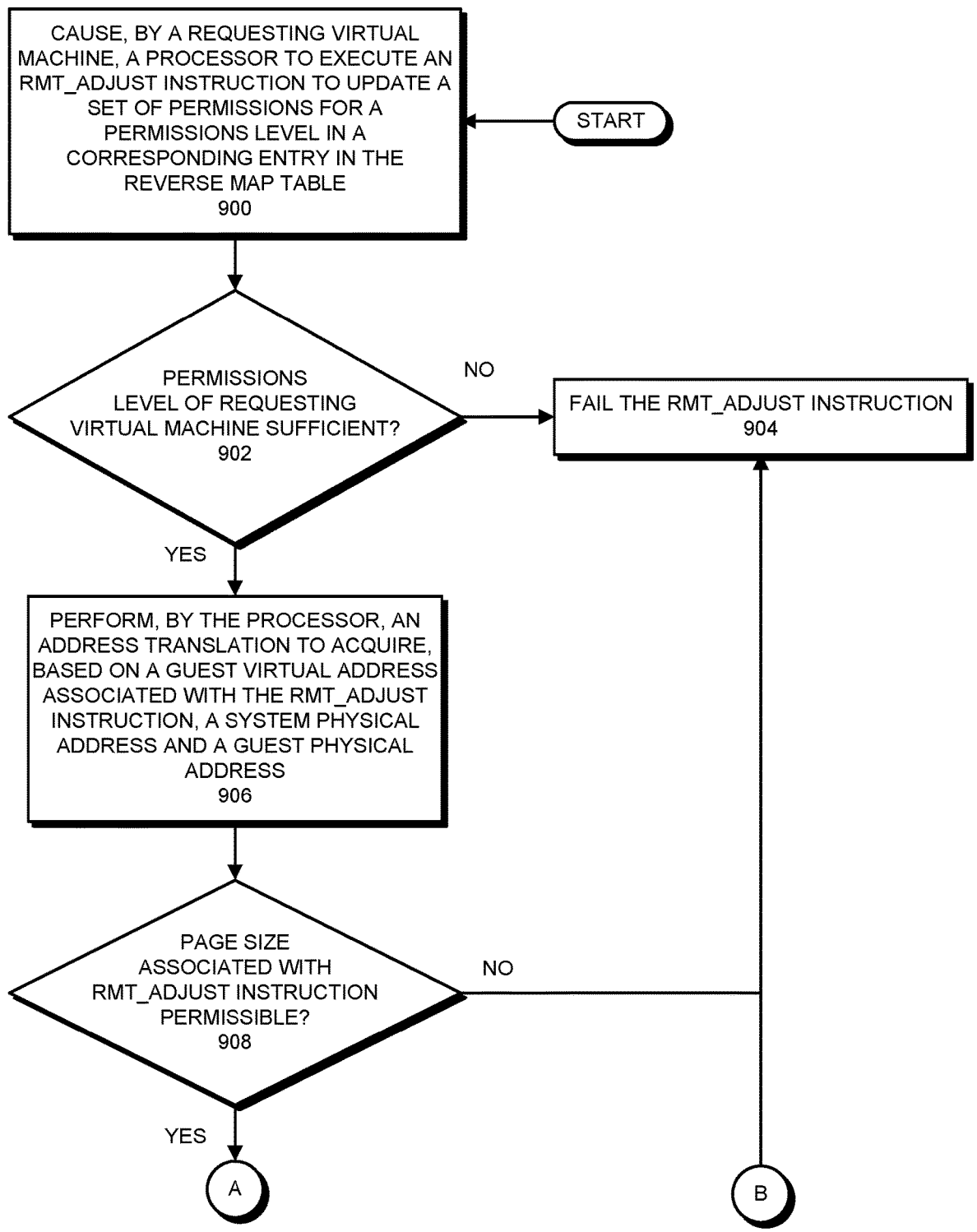
FIG. 9A presents a flowchart illustrating a process for executing an RMT_ADJUST instruction in accordance with some embodiments.
Figure 9B:
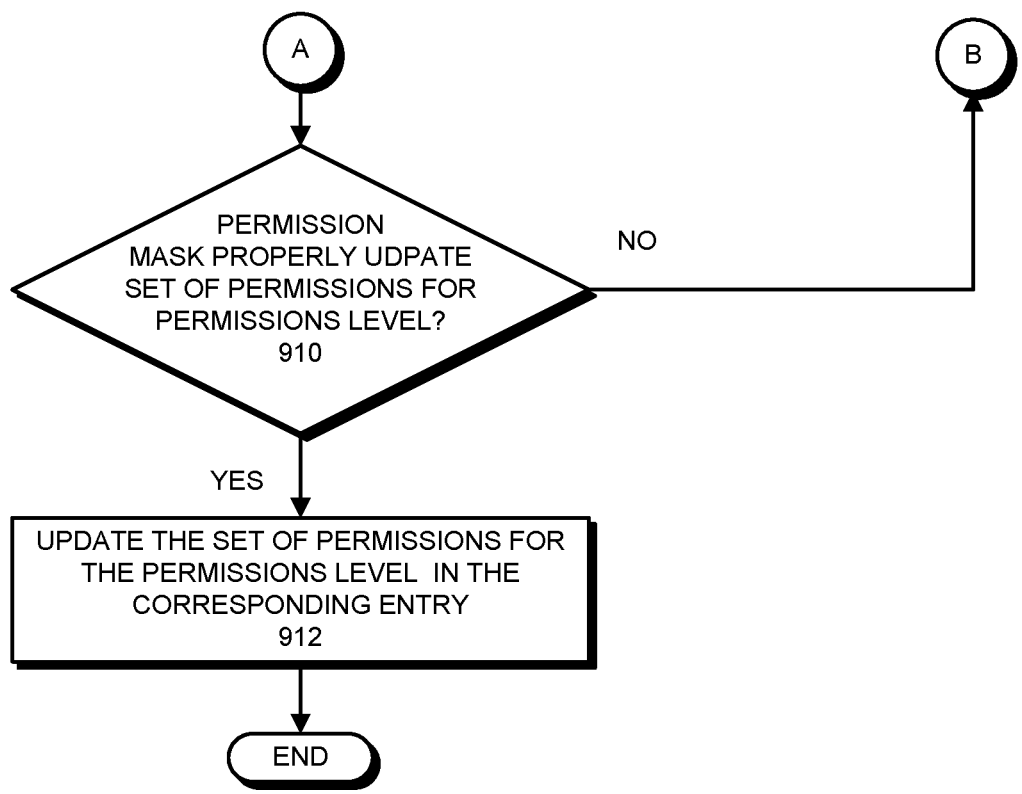
FIG. 9B presents a flowchart illustrating a process for executing an RMT_ADJUST instruction in accordance with some embodiments.

FIGS. 9A-9B present a flowchart illustrating a process for updating a set of permissions in a permission level in an entry in the reverse map table in accordance with some embodiments. The operations shown in FIGS. 9A-9B are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements. For example, in some embodiments, the operations described as being performed when executing the RMT_ADJUST instruction are performed without requiring a dedicated instruction. For instance, in these embodiments, the input parameters may be written to reserved memory locations and the processor may, via an interrupt, hardware register (flag) value, or other mechanism, be caused to commence the described operations. As another example, in FIGS. 9A-9B, the operations are described as being performed by a virtual machine, but the operations may be performed by a sub virtual machine.

As can be seen in FIGS. 9A-9B, the process starts when a requesting virtual machine causes a processor to execute an RMT_ADJUST instruction to update a set of permissions for a permissions level in a corresponding entry in the reverse map table (step 900). In some embodiments, the RMT_ADJUST instruction takes, as input parameters, the guest virtual address, a page size (e.g., 4 kB, 2 MB, etc.), a target permissions level, and a virtual machine permission mask, which are used as described below in subsequent operations.

When executing the RMT_ADJUST instruction, the processor checks to ensure that a permissions level of the requesting virtual machine is sufficient (step 902). During this operation, the permissions level of the requesting virtual machine is compared to the permissions level that is to be updated in the entry to determine that the permissions level of the requesting virtual machine is higher than the permissions level for which the set of permissions is to be changed. In other words, the processor checks to ensure that the requesting virtual machine is sufficiently privileged to change the permissions level information in the entry. If the permissions level check fails, the processor fails the RMT_ADJUST instruction (step 904). "Failing" the RMT_ADJUST instruction, as used herein, means that the processor halts or terminates further processing of the RMT_ADJUST instruction and may transmit a failure reason code or assert a specified fault to the requesting virtual machine. When the permissions check does not fail, the processor requests a translation from the table walker for the guest virtual address, thereby acquiring the associated guest physical address and the system physical address (step 906).

The processor next checks the page size associated with the RMT_ADJUST instruction to ensure that the page size is permissible (step 908). Generally, during this operation, the processor checks to ensure that an improper page size is not included with the RMT_ADJUST instruction in order to avoid updating permissions for entries for incorrectly-sized pages. For example, the processor may confirm that the page size is properly aligned on page size boundaries and/or that the page size in a corresponding entry in the reverse map table matches the page size. If the page-size check fails, the processor fails the RMT_ADJUST instruction (step 904).

When the page size is permissible, the processor checks the virtual machine permissions levels in the corresponding entry in the reverse map table to ensure that the virtual machine permission mask from the RMT_ADJUST instruction properly updates the permissions level (step 910). For example, the processor can check to ensure that the requested virtual machine permission mask does not provide more privileged access (i.e., give broader permissions) to the requesting virtual machine or another virtual machine than the privilege of the requesting virtual machine. If the permissions alterations check fails, the processor fails the RMT_ADJUST instruction (step 904).

When the checks in steps 902 and 908-910 are passed, the processor updates the permissions level in the corresponding entry (step 912). During this operation, the processor stores, in the set of permissions in the particular permissions level in the corresponding entry, a value, such as 1, 10110, or another value, that represents the permissions mask. In some embodiments, the permission mask overwrites all of the permissions indicators in the set of permissions for the permissions level. In some embodiments, the processor also transmits, to the requesting virtual machine, a success message or code.

In some embodiments, in addition to the other operations in FIGS. 9A-9B, the processor locks the entry in the reverse map table before performing the checks and the update (e.g., steps 908-912) using the lock indicator as described herein. In these embodiments, the processor selectively unlocks the entry (i.e., will return the lock to the previous locked/unlocked state) upon failing the RMT_ADJUST instruction or successfully updating the validated indicator in the corresponding entry.

In some embodiments, "unaware" virtual machines or portions thereof, i.e., virtual machines or portions thereof that do not (and maybe cannot) perform some or all of the operations for using the virtual machine permissions levels described herein can be assisted by other virtual machines in the use of the virtual machine permissions levels. In these embodiments, an unaware virtual machine should be associated with a lower permissions level and a higher-permissions level and an "aware" virtual machine should be running on the computing device. The higher-permissions level virtual machine is informed of permissions faults for the unaware virtual machine (e.g., by the hypervisor or another entity) and then processes the permissions faults on behalf of the unaware virtual machine. In some of these embodiments, the higher permissions level virtual machine may be provided access to certain secure information of the unaware virtual machine, such as read access to an encrypted control block of the lower permission virtual machine, so that the higher permissions level virtual machine can interact with the unaware virtual machine and/or handle operations on behalf of the unaware virtual machine.

In some embodiments, virtual machine permissions levels may be enabled/disabled at specified times (i.e., are optionally and selectably enabled). For example, in some embodiments, virtual machine permissions levels are enabled (or not) at startup, as a particular event happens, as a hardware or software operating state changes, and/or at other times. In these embodiments, virtual machine permissions levels information is not used when virtual machine permissions levels are disabled—and thus the checks and other operations described herein are altered, in that they do not include the virtual machine permissions levels checks. In some of these embodiments, when virtual machine permissions levels are disabled, the reverse map table does not include information about and/or space for the permissions level information. In other words, when virtual machine permissions levels is disabled, each reverse map table entry may include less information and thus consume less space in memory.

Using the Reverse Map Table

Figure 10:
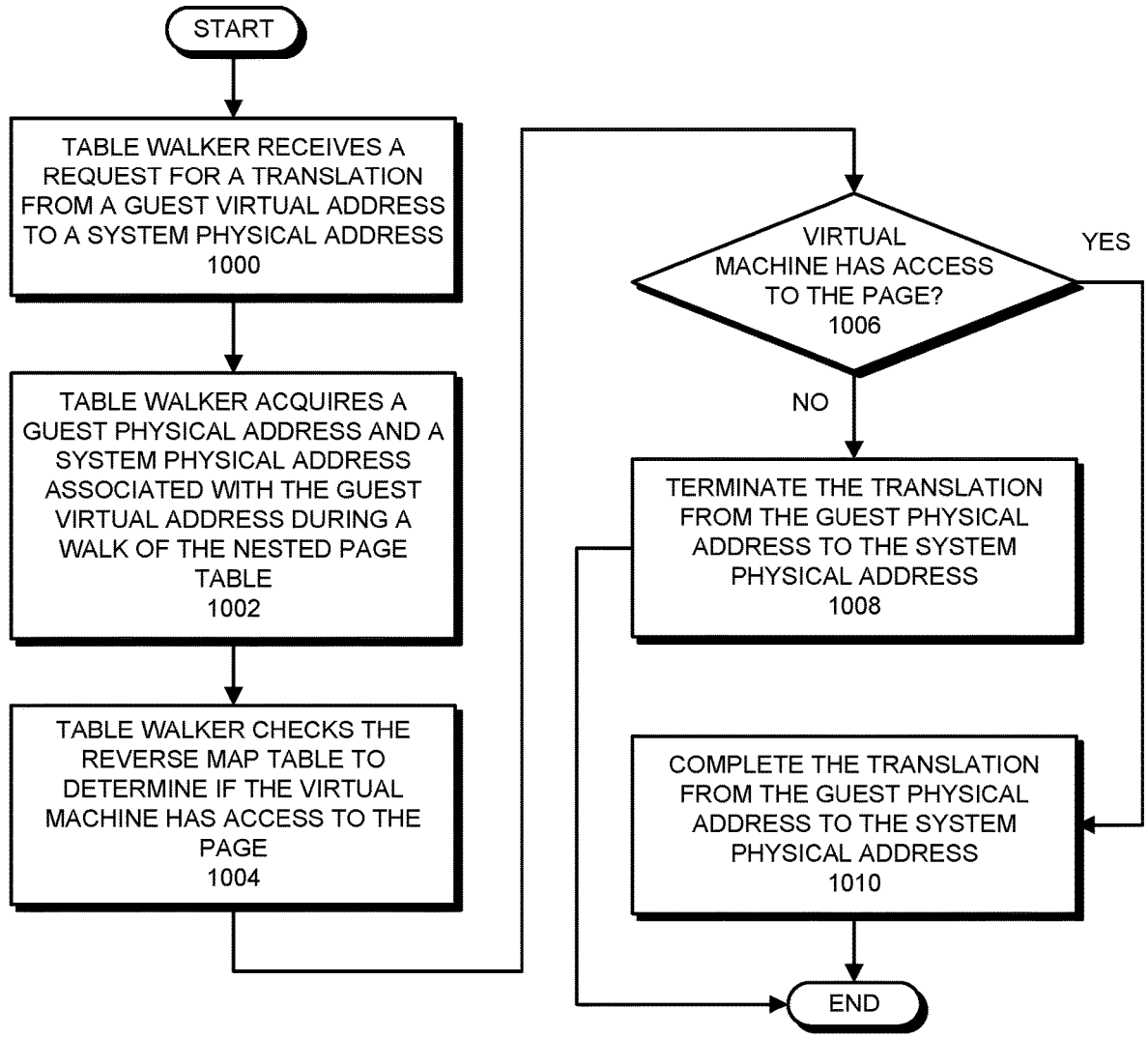
FIG. 10 presents a flowchart illustrating a process for using the reverse map table in accordance with some embodiments.

FIG. 10 presents a flowchart illustrating a process for using the reverse map table in accordance with some embodiments. The operations shown in FIG. 10 are presented as a general example of operations performed by some embodiments. The operations performed by other embodiments include different operations and/or operations that are performed in a different order. Additionally, although certain mechanisms/elements are used in describing the operations (e.g., a processor, etc.), in some embodiments, other mechanisms perform the operations and/or the operations are performed on other mechanisms/elements.

The process shown in FIG. 10 starts when a table walker receives a request for a translation from a guest virtual address to a system physical address (step 1000). For example, the processor may, while executing a virtual machine, encounter a request to perform a memory access of a given operation type at the guest virtual address for the virtual machine. The processor may then send the request to the table walker for the translation from the guest virtual address to a system physical address.

The table walker then performs table walks in the corresponding guest page table and the nested page table, eventually acquiring a guest physical address and the system physical address associated with the guest virtual address (step 1002). While acquiring the system physical address during the page table walk, the table walker may also acquire other information from the nested page table (or elsewhere), such as the size of the page, etc. The processor may also check one or more TLBs in an attempt to find a cached copy of the translation, in an attempt to avoid performing the table walks. It is assumed for this example, however, that a cached copy of the translation is not available.

Figure 11:
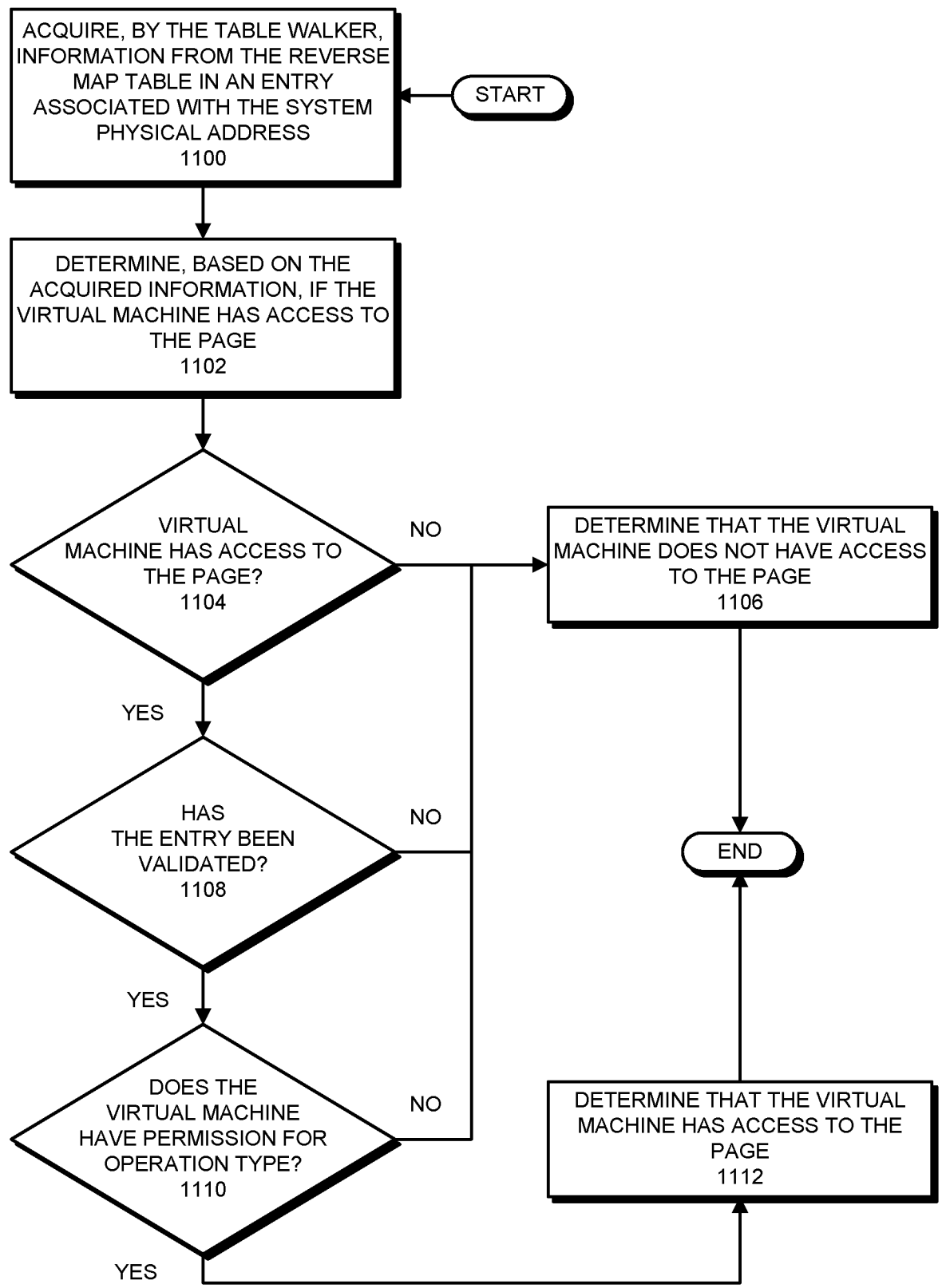
FIG. 11 presents a flowchart illustrating a process for checking the reverse map table to determine whether the virtual machine has access to the corresponding page in accordance with some embodiments.

Upon acquiring the system physical address, the table walker checks the reverse map table to determine whether the virtual machine has access to the corresponding page (step 1004). FIG. 11 presents a flowchart illustrating a process for checking the reverse map table to determine whether the virtual machine has access to the corresponding page in accordance with some embodiments. The operations shown in FIG. 11 are presented as a general example of operations performed by some embodiments. The operations performed by other embodiments include different operations and/or operations that are performed in a different order. Additionally, although certain mechanisms/elements are used in describing the operations (e.g., a table walker, etc.), in some embodiments, other mechanisms perform the operations and/or the operations are performed on other mechanisms/elements.

As shown in FIG. 11, the process starts when the table walker acquires, from reverse map table 228, information in an entry associated with the system physical address (step 1100). For example, the table walker may acquire the information from an entry in the reverse map table 228 at an offset from a base address of the reverse map table 228 proportional to or otherwise based on the system physical address. As described above, in some embodiments, the information from the entry includes some or all of a guest ID, a recorded guest physical address, a sub-page count, a validated indicator, a size, virtual machine permissions level information, and an assigned indicator.

The table walker then determines, based on the acquired information, if the virtual machine has access to the page (step 1102). For example, the table walker can determine whether the entry is valid (i.e., currently includes information that is not invalid, stale, etc.), as shown by the assigned indicator. As another example, the table walker can determine if the guest physical address from the entry matches the guest physical address acquired during the table walk. As another example, the table walker can determine if the page size acquired from the nested page table matches the page size from the entry. As another example, the table walker can determine if the recorded guest ID (ASID) from the entry matches an identifier associated with the requesting virtual machine. As another example, the table walker can determine if the entry is marked as locked (and thus may be in the process of being updated or modified). When any one of these checks fails, i.e., the information from the entry in the reverse map table does not agree with the information from the table walk and/or the information in the reverse map table indicates that the virtual machine does not have access, the table walker determines that the virtual machine does not have access to the page (step 1106).

When the acquired information indicates that the virtual machine has access to the page (step 1104), the table walker determines if the information from the entry indicates that the page has been validated (step 1108). For example, the table walker can determine if the validated indicator from the acquired information is set to a specified value, such as 1, indicating that the page has been validated. When the page has not been validated, the table walker determines that the virtual machine does not have access to the page (step 1106). In other words, if the information from the entry in reverse map table 228 indicates that the virtual machine has not marked the page as validated, the table walker determines that the virtual machine does not have access to the page. Recall that the validated indicator is cleared/unset, thereby setting the entry to indicate that the page has not been validated, each time that the hypervisor updates the entry (via the RMT_UPDATE operation), thereby indicating that the mapping from guest physical address to system physical address (or other information in the entry) has changed. When the validated indicator shows that the page has been validated, therefore, it is known that the hypervisor has not changed the entry.

The table walker also determines whether the requesting virtual machine has permission to perform an operation type indicated in the translation request (step 1110). During this operation, the table walker uses a permissions level associated with the virtual machine (e.g., a permissions level assigned to the virtual machine when the virtual machine commenced operation) to determine if corresponding permissions level information from the entry in the reverse map table indicates that operation type is permissible. For example, the table walker can check one or more bits of a set of permissions associated with the permissions level of the entry in the reverse map table to determine if the one or more bits indicate that the operation type is permissible. When the virtual machine does not have permission for the operation type, the table walker determines that the virtual machine does not have access to the page (step 1106). In other words, the virtual machine is not to be allowed to access the page because the particular operation type is impermissible for the virtual machine for that page.

In contrast to the above-described cases, when virtual machine is determined to have access (step 1104), the entry has been validated (step 1108), and the virtual machine has permission for the operation type (step 1110), the table walker determines that the virtual machine has access to the page (step 1112). In this case, the information about the virtual machine and the request agree with, and are permissible in view of, the information in the entry in the reverse map table, meaning that the requested access of the page is allowed.

Returning to FIG. 10, when the virtual machine does not have access to the corresponding page (step 1006), the table walker terminates the translation from the guest physical address to the system physical address (step 1008). During this operation, the table walker may assert a fault or perform another remedial action, and/or otherwise terminate the translating and does not provide the system physical address to the requesting virtual machine. For example, when the validated indicator is unset/cleared, a validated fault may be asserted to the virtual machine (and/or other software entities) so that the virtual machine can determine how to handle the fault. In this case, the virtual machine may subsequently validate the entry (e.g., using the PVALIDATE instruction)

and proceed with operations (such as when the virtual machine's local record agrees with the not validated state of the entry when the entry has not previously been validated, etc.). Alternatively, the virtual machine may determine that the entry has been changed without knowledge of the virtual machine (such as by a malicious entity in the computing device) and may therefore refuse to use information from the entry—and may perform error handling operations. As another example, when the virtual machine has insufficient permissions, a permissions fault may be asserted to the virtual machine and/or other entities (e.g., a different higher-permission virtual machine), thereby enabling the virtual machine and/or other entities to handle the permissions fault (such as by adjusting permissions, canceling the operation, having another entity perform the operation, etc.).

Otherwise, when the virtual machine has access to the corresponding page (step 1006), the table walker completes the translation from the guest physical address to the system physical address (step 1010). Completing the translation includes providing the system physical address to the processor, where the system physical address may be used for accessing memory, etc. The processor may also cache the returned virtual address to physical address translation (i.e., the virtual address to system physical address translation) in a TLB for subsequent lookups.

The above-described checking operations ensure that two rules are followed for pages that are allocated to a particular virtual machine (e.g., not shared). The first rule is that each page in memory is associated with only one guest address at a time. This rule is enforced during steps 1104-1106 above. The second rule is that an in-use page that is allocated only to a particular virtual machine should not be remapped by the hypervisor without the virtual machine being involved. This rule is enforced by using the above-described RMT_UPDATE operation in FIG. 6 and the checks of reverse map table in steps 1104 and 1108.

In some embodiments, table walks performed for host accesses (e.g., for hypervisors) may be handled differently than table walks for virtual machines and/or guest operating systems. For example, upon receiving a virtual address to physical address translation request with an identifier that identifies the request as having come from a hypervisor/host and indicating that the access is for a write (i.e., not read only or for an instruction fetch), the table walker may assert a page fault or perform another remedial action when a corresponding entry in reverse map table 228 is set to indicate that a virtual machine owns the page, when a lock indicator is set in the entry, when a smaller page is not within a larger page accessible/writeable by the hypervisor, and/or when a larger page includes one or more smaller pages that are not accessible/writeable by the hypervisor. Note that the first of these checks, i.e., the check of whether a virtual machine owns the page, is used to ensure that the hypervisor does not access private virtual machine pages with write access. In other words, the hypervisor is prevented, from performing a write access to a page that is owned by a virtual machine.

Shared Pages

In some embodiments, pages in memory can be shared by two or more virtual machines. In other words, individual pages may be accessible by two or more virtual machines. For example, pages that include program code from common libraries (stdlib.h, etc.), applications, kernel routines, etc. may be shared. As another example, pages of data that are to be read by virtual machines may be shared. In some embodiments, shared pages may be globally shared pages, in that the pages are commonly used and therefore shareable by at least some, and possibly all, virtual machines. In these embodiments, the computing device uses various mechanisms for controlling access to shared pages. For example, in some embodiments, the globally shared page indicator in an entry for the page in reverse map table 228 may be set to a specified value (e.g., 1) to indicate that the page is shared, an immutable indicator may be set to indicate that the page is immutable, etc. In some embodiments, shared pages are encrypted with a key that is shared between all of the virtual machines (or at least between virtual machines that are permitted shared access to the page).

In some embodiments, only certain types of accesses are permitted for shared pages. For example, writes may be impermissible for shared pages. During the above-described check of the reverse map table (step 1006, 1104), in some embodiments, the system checks virtual machine permissions levels to ensure that impermissible memory accesses (such as writes) are not being performed. In these embodiments, the table walker may determine that the virtual machine does not have access to the page when the memory access is impermissible for a shared page. Some checks, such as checks of the validated indicator, are not performed for shared pages.

Encrypted Pages

In some embodiments, pages in memory that are allocated to a given virtual machine are encrypted using a key specific to the given virtual machine (e.g., as a security measure). In these embodiments, virtual machines may include an indicator associated with each page that shows whether the corresponding page is encrypted. In some embodiments, the above-described checks of the reverse map table are not performed for unencrypted pages (as these pages may be generally presumed to be unsecure/untrustworthy). Shared pages may be unencrypted and/or encrypted using a key known to all virtual machines.

Enabling/Disabling Checks of the Reverse Map Table

In some embodiments, a hardware or software switch is available for enabling and disabling the above-described checks of the reverse map table. For example, each virtual machine may be provided with a flag in software, a register, etc. that can have a specified value (e.g., 1) written to the flag, register, etc. to enable the above-described checks. In these embodiments, when the flag, register, etc. is set to another value (e.g., 0), the checks are not performed.

Checks for Entities Other than Virtual Machines

Although embodiments are described above in which virtual machines are allocated pages, in some embodiments, entities other than virtual machines are protected from malicious page remapping in similar ways. For example, an input-output memory management unit (IOMMU) may perform similar checks for tables associated with peripheral devices (i.e., a table that is equivalent to the reverse map table, but for the IOMMU). Generally, the described embodiments are operable with any entity in the computing device that can access pages in memory.

In some embodiments, a computing device (e.g., computing device 200 in FIG. 2 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations. In addition, entities may be referred to in describing some embodiments. Generally, an entity can include hardware functional blocks (e.g., individual circuits or circuit elements, complex circuits, ASICs, processors, etc.) and/or software programs (e.g., routines, applications, functions, etc.) that can perform the operations ascribed to or otherwise associated with the entity.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
a processor;
a hardware table walker; and
a memory that stores a reverse map table (RMT), a page table, and a plurality of pages of memory;
wherein the table walker is configured to:
receive, based on an access request from a virtual machine, a request to translate a guest virtual address into a system physical address associated with a page of memory;
use a guest physical address associated with the guest virtual address to acquire the system physical address from a corresponding entry in the page table;
perform one or more checks in the RMT to ensure that the guest physical address is correctly mapped to the system physical address in the page table, the one or more checks comprising performing a validation check to determine whether the virtual machine previously validated an entry in the RMT associated with the system physical address; and
based on an outcome of the validation check, selectively provide the system physical address for use in performing the access for the virtual machine.

2. The computing device of claim 1, wherein selectively providing the system physical address for use in performing the access for the virtual machine comprises:
performing one or more additional checks of other information in the entry to determine whether the virtual machine has access to the page of memory; and
when the virtual machine previously validated the entry and the virtual machine has access to the page of memory, providing the system physical address for use in performing the access for the virtual machine.

3. The computing device of claim 2, wherein the one or more additional checks comprise:
checking a recorded guest physical address in the entry to determine whether the recorded guest physical address matches the guest physical address, wherein the recorded guest physical address is an address that is recorded as being previously mapped to the system physical address, and wherein the virtual machine has access to the page of memory when the recorded guest physical address matches the guest physical address.

4. The computing device of claim 3, wherein the one or more additional checks further comprise:
checking one or more permissions level indicators in the entry to determine whether an operation type identified in the access request is permissible for the virtual machine, wherein the virtual machine has access to the page of memory when the operation type is permissible.

5. The computing device of claim 4, wherein the one or more additional checks further comprise one or more of:
checking an assigned indicator in the entry to determine whether the entry is marked as being currently in use;
checking an identifier in the entry that identifies a previously-accessing virtual machine to determine whether the virtual machine matches the previously-accessing virtual machine; and
checking a recorded page size in the entry that indicates a size of a page of memory associated with the system physical address to determine whether a page size indicated in the access request matches the recorded page size,
wherein the virtual machine has access to the page of memory when the entry is marked as being currently in use, the virtual machine matches the previously-accessing virtual machine, and the page size matches the recorded page size.

6. The computing device of claim 1, wherein selectively providing the system physical address to the virtual machine comprises:
when the virtual machine has not previously validated the entry, signaling a validation fault to the virtual machine and not providing the system physical address for use in performing the access for the virtual machine.

7. The computing device of claim 1, wherein the processor is configured to:
receive, from the virtual machine, a request to mark the entry as having been validated by the virtual machine; and
update information in the entry to indicate that the entry has been validated by the virtual machine.

8. The computing device of claim 1, wherein the processor is configured to:
receive, from the virtual machine, a request to mark the entry as not having been validated by the virtual machine; and
update information in the entry to indicate that the entry has not been validated by the virtual machine.

9. The computing device of claim 1, wherein the processor is configured to:
receive, from an entity in the computing device, a request to update information in the entry; and
while updating the information in the entry, update the entry to indicate that the entry has not been validated by the virtual machine.

10. A computing device, comprising:
a processor;
a hardware table walker; and
a memory that stores a reverse map table (RMT), a page table, and a plurality of pages of memory;
wherein the table walker is configured to:
receive, based on an access request from a virtual machine, a request to translate a guest virtual address into a system physical address associated with a page of memory;
use a guest physical address associated with the guest virtual address to acquire the system physical address from a corresponding entry in the page table;
perform a permissions check to determine whether an entry in the RMT associated with the system physical address indicates that the virtual machine has permission to perform an operation type indicated in the access request; and
based on an outcome of the permissions check, selectively provide the system physical address for use in performing the access for the virtual machine.

11. The computing device of claim 10, wherein performing the permissions check comprises:
using a permissions level of the virtual machine to acquire a permission indicator associated with the operation type from among set of permissions in a corresponding permissions level in the entry; and
when the permission indicator is set to a predetermined value that indicates that virtual machines having the permissions level are permitted to perform the operation type indicated in the access request, determining that the virtual machine has permission to perform the operation type.

12. The computing device of claim 10, wherein selectively providing the system physical address for use in performing the access for the virtual machine comprises:
performing one or more additional checks of other information in the entry to determine whether the virtual machine has access to the page of memory; and
when the virtual machine has permission to perform the operation type indicated in the request and the virtual machine has access to the page of memory, providing the system physical address for use in performing the access for the virtual machine.

13. The computing device of claim 12, wherein the one or more additional checks comprise:
checking a recorded guest physical address in the entry to determine whether the recorded guest physical address matches the guest physical address, wherein the recorded guest physical address is an address that is recorded as being previously mapped to the system physical address, and wherein the virtual machine has access to the page of memory when the recorded guest physical address matches the guest physical address.

14. The computing device of claim 13, wherein the one or more additional checks further comprise:
checking a validated indicator in the entry to determine whether the virtual machine previously validated the entry, wherein the virtual machine has access to the page of memory when the virtual machine previously validated the entry.

15. The computing device of claim 14, wherein the one or more additional checks further comprise one or more of:
checking an assigned indicator in the entry to determine whether the entry is marked as being currently in use;
checking an identifier in the entry that identifies a previously-accessing virtual machine to determine whether the virtual machine matches the previously-accessing virtual machine; and
checking a recorded page size in the entry that indicates a size of a page of memory associated with the system physical address to determine whether a page size indicated in the access request matches the recorded page size,
wherein the virtual machine has access to the page of memory when the entry is marked as being currently in use, the virtual machine matches the previously-accessing virtual machine, and the page size matches the recorded page size.

16. The computing device of claim 10, wherein selectively providing the system physical address to the virtual machine comprises:
when the virtual machine does not have permission to perform the operation type indicated in the request, signaling a permissions fault to the virtual machine and not providing the system physical address to the virtual machine.

17. The computing device of claim 10, wherein the processor is configured to:
receive, from a requesting entity, a request to update a set of permissions for one or more permissions levels in the entry;
determine, based on a permissions level of the requesting entity, that the requesting entity is allowed to update the set of permissions for the one or more permissions levels in the entry; and
based on the determining, update the set of permissions for the one or more permissions levels in the entry.

18. The computing device of claim 10, wherein the virtual machine is assigned a level of permissions from among a plurality of levels of permissions.

19. A non-transitory computer-readable storage medium that stores information readable by a computing device, the information comprising:
- a reverse map table comprising a number of entries, each entry associated with a page of memory in the computing device, and each entry comprising:
  - a validated indicator, wherein the validated indicator is set to indicate that a virtual machine has marked the entry as validated; and
  - a virtual machine permissions level block, the virtual machine permissions level block comprising sets of permissions for one or more permissions levels, the set of permissions including one or more indicators indicating whether corresponding operation types are permitted for virtual machines assigned the permissions level.

* * * * *